US007774454B2

(12) United States Patent
Yamasaki et al.

(10) Patent No.: US 7,774,454 B2
(45) Date of Patent: Aug. 10, 2010

(54) INFORMATION COMMUNICATION DEVICE, INFORMATION COMMUNICATION METHOD, REMOTE MANAGEMENT SYSTEM, AND RECORDING MEDIUM STORING COMPUTER PROGRAM FOR INFORMATION COMMUNICATION

(75) Inventors: Kimihito Yamasaki, Tenri (JP); Tomoki Tanaka, Yamatokoriyama (JP); Masakatsu Nakamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1152 days.

(21) Appl. No.: 09/804,825

(22) Filed: Mar. 13, 2001

(65) Prior Publication Data
US 2001/0028473 A1   Oct. 11, 2001

(30) Foreign Application Priority Data
Mar. 13, 2000   (JP)   ............................. 2000-069322

(51) Int. Cl.
*G06F 15/173*   (2006.01)
(52) U.S. Cl. ...................... 709/224; 709/206; 709/223; 370/241; 714/100; 714/25; 714/31; 714/37; 714/48
(58) Field of Classification Search ......... 709/201–253, 709/246; 714/57
See application file for complete search history.

(56) References Cited

U.S. PATENT DOCUMENTS

| 5,414,494 | A | * | 5/1995 | Aikens et al. .................. 399/1 |
| 5,715,393 | A | * | 2/1998 | Naugle ........................ 709/224 |
| 5,740,230 | A | * | 4/1998 | Vaudreuil .................... 709/206 |
| 5,835,724 | A | * | 11/1998 | Smith ......................... 709/206 |
| 5,887,216 | A |   | 3/1999 | Motoyama |
| 6,003,078 | A |   | 12/1999 | Kodimer et al. |
| 6,073,133 | A | * | 6/2000 | Chrabaszcz .................. 707/10 |
| 6,374,296 | B1 | * | 4/2002 | Lim et al. .................... 709/225 |
| 6,385,644 | B1 | * | 5/2002 | Devine et al. ............... 709/206 |
| 6,430,711 | B1 | * | 8/2002 | Sekizawa ..................... 714/47 |

(Continued)

FOREIGN PATENT DOCUMENTS

JP   2707459   7/1990

(Continued)

OTHER PUBLICATIONS

Winters, Gerald et al. "An Architecture for Monitoring and Modeling Network Systems." Proceedings of the 1995 conference of the Centre for Advanced Studies on Collaborative research. IBM, 1995.*

(Continued)

*Primary Examiner*—Vivek Srivastava
*Assistant Examiner*—Jeffrey R Swearingen
(74) *Attorney, Agent, or Firm*—Edwards Angell Palmer & Dodge LLP; David G. Conlin; Peter J. Manus

(57) ABSTRACT

A digital complex machine in accordance with the present invention is set so as to notify a manager of device information thereof by E-mail. It is also particularly set so as to convert device information into attached data and to transmit a device information mail containing the attached data to a server of the manager. In other words, since transmitting device information in the attached data format that is less possibly perceived by the third party, the digital complex machine is capable of suppressing leakage of device information.

15 Claims, 9 Drawing Sheets

U.S. PATENT DOCUMENTS

| | | | | |
|---|---|---|---|---|
| 6,452,689 | B1* | 9/2002 | Srinivasan | 358/1.15 |
| 6,501,834 | B1* | 12/2002 | Milewski et al. | 379/93.24 |
| 6,519,568 | B1* | 2/2003 | Harvey et al. | 705/1 |
| 6,522,421 | B2* | 2/2003 | Chapman et al. | 358/1.15 |
| 6,557,033 | B2* | 4/2003 | Maeda | 709/223 |
| 6,622,266 | B1* | 9/2003 | Goddard et al. | 714/44 |
| 6,631,247 | B1* | 10/2003 | Motoyama et al. | 399/8 |
| 6,654,746 | B1* | 11/2003 | Wong et al. | 707/10 |
| 6,654,892 | B1* | 11/2003 | Karim | 713/201 |
| 6,714,977 | B1* | 3/2004 | Fowler et al. | 709/224 |
| 6,785,015 | B1* | 8/2004 | Smith et al. | 358/1.15 |
| 6,816,884 | B1* | 11/2004 | Summers | 709/206 |
| 6,859,213 | B1* | 2/2005 | Carter | 715/752 |
| 6,961,659 | B2* | 11/2005 | Motoyama et al. | 701/213 |
| 6,970,952 | B2* | 11/2005 | Motoyama | 709/224 |
| 7,127,515 | B2* | 10/2006 | Patterson | 709/206 |
| 7,194,560 | B2* | 3/2007 | Motoyama | 709/224 |
| 2002/0138612 | A1 | 9/2002 | Sekizawa | |

FOREIGN PATENT DOCUMENTS

| | | |
|---|---|---|
| JP | 09-134297 | 5/1997 |
| JP | 2707459 | 10/1997 |
| JP | 10-097444 | 4/1998 |
| JP | 10-164181 | 6/1998 |
| JP | 11-353145 | 12/1999 |

OTHER PUBLICATIONS

Bhushan, Bharat et al. "Requirements and the Concept of Cooperative System Management." International Journal of Network Management. vol. 8, 139-58. 1998.*

Halevi, Shai et al. "Public-Key Cryptography and Password Protocols". ACM Transactions on Information and System Security. vol. 2, No. 3, Aug. 1999, pp. 230-268.*

"Shakaijin no tameno denshi mail tettei katsuyoujutsu, soujushin no kihon wo master suru," (p. 36-47), Nikkei PC 21, vol. May 1998, No. 29, published in Japan on May 1, 1995.

* cited by examiner

FIG. 5

| ADDRESS | | M1 |
|---|---|---|
| CC | ABC CO. | |
| TITLE | | |

MACHINE INFORMATION   1999.12.01~1999.12.31
No.1   LOCATION            3F PLANNING DEPARTMENT
       MACHINE NAME        AR-405
       SERIAL No.          99267×××
       OPTION              STAPLE SOATER
       ROM VERSION         Ver. 2.06
No.2   LOCATION            4F SALES DEPARTMENT

— M2

M3 — CONF. ATTACHED DATA   CONF. ATTACHED DATA

FIG. 6

| TYPE OF ERROR | PAPER JAM | NO PAPER | NO TONER | OTHER ERRORS |
|---|---|---|---|---|
| REPORT/NON-REPORT | NON-REPORT | NON-REPORT | REPORT | REPORT |

F I G. 1 3

| ADDRESS | |
|---|---|
| CC | |
| TITLE | |

MACHINE INFORMATION    1999.12.01～1999.12.31

| | | |
|---|---|---|
| TOTAL COUNTER | | 29,352 sheets |
| COPY COUNTER | | 2,541 sheets |
| PRINT COUNTER | | 1,376 sheets |
| NUMBER OF TROUBLES | | 2 times |
| PAPER FEEDER COUNTER | MANUAL | 486 sheets |
| | 1st TRAY | 1,393 sheets |

INFORMATION COMMUNICATION DEVICE, INFORMATION COMMUNICATION METHOD, REMOTE MANAGEMENT SYSTEM, AND RECORDING MEDIUM STORING COMPUTER PROGRAM FOR INFORMATION COMMUNICATION

FIELD OF THE INVENTION

The present invention relates to an information communication device for appropriately transmitting information about a management target device at a user to a manager, a remote management system including the information communication device, an information communication method applied to the information communication device, and a recording medium that stores a computer program for information communication by the foregoing information communication method.

BACKGROUND OF THE INVENTION

Generally, a manufacturer that sells or lends management target devices such as copying machines is required to appropriately grasp information about such devices in order to take appropriate measures according to conditions of the devices.

Here, indicated by "management target device" is a device that is arranged so that its maintenance, including repair of parts out of work and replenishment of expendable supplies, is implemented by a manufacturer (or a service company), that is, a device that requires maintenance by external. Further, examples of information (device information) to be grasped by a manufacturer include a state of use of the device (for instance, in the case of a copying machine, the number of copied sheets, etc.), a state of an operation of the device (a quantity of remaining toner, a history of occurrence of troubles, etc.).

In other words, by regularly managing (supervising) such device information, the manufacturer executes regular check, replacement and replenishment of expendable supplies, etc., so as to set conditions that should allow the device to operate in a stable state.

Incidentally, recently, a remote management system that collects such device information as above and informs the manufacturer of the information has been widely used. Such a system is a system that reports information of each management target device to a manager of a manufacturer via predetermined communication lines.

Further, a conventional remote management system carries out information communication over telecommunication via a modem, using telephone lines as communication lines. On the contrary, recently, information communication by electronic mails that are inexpensive in terms of charges has recently come to be adapted more widely as the computer network such as Internet has been prevailed.

For instance, the Japanese Patent No. 2707459 (Issue Date: Jan. 28, 1998) discloses a facsimile machine that detects a trouble that has occurred to a device and sends an abnormality notice report to a manager by E-mail.

Further, FIG. 13 is an explanatory view illustrating an example of an E-mail used by a conventional remote management system. Incidentally, the E-mail shown in the figure is used in a system for managing a digital complex machine having functions as a copying machine and a printer.

As shown in the figure, the remote management system is arranged so that the number of printed sheets (a count of a total counter) and the number of troubles should be transmitted to a manufacturer by E-mail. Further, it is also set so as to transmit each number (a count of a counter) of printed sheets regarding each printing form (copy or printing) and each paper feeder.

Such a remote management system enables a service system that is capable of checking conditions of each device at real time and immediately copying with a trouble or the like whenever it takes place.

Incidentally, some users or manufacturers let device information include information (counter information) that they do not like to have disclosed to the third party. However, there is a problem that it is difficult to prevent leakage of device information in the case where device information is communicated by E-mail.

To be more specific, in communication by E-mail, device information is of course sent/received as data in the E-mail form (text data set in accordance with an E-mail system).

Therefore, in the case where an E-mail is obtained by a third party for some reasons, the device information is easily understood by the third party. Further, a security system for the E-mail system cannot completely protect data against interception by hackers. Therefore, there is a possibility that device information could be stolen by vicious hackers.

Further, a device that detects abnormality of the device as a facsimile device and immediately sends an abnormality notice report, like that taught by the foregoing publication, has a problem as described below.

Namely, in such a device, there is no limitation on detection of device abnormality and transmission of abnormality notice report. Therefore, even after sending the abnormality notice mail to the manager and during correction of the abnormality by the user, an abnormality notice report of the same content is repeatedly transmitted each time the abnormality of the device is detected.

SUMMARY OF THE INVENTION

The present invention is made to solve the foregoing problems of prior art. The first object of the present invention is to provide an information communication device that ensures prevention of leakage of information even in the case where device information is transmitted by electric mail.

Further, the second object of the present invention is to provide an information communication device that is capable of transmitting device information at appropriate times.

To achieve the foregoing first object, a first information communication device (first communication device) in accordance with the present invention is an information communication device notifying a managing device of device information about a management target device by electric mail, and is arranged by comprising a transmission processing section that converts the device information into attached data, and transmits an electric mail containing the attached data to the managing device.

In the arrangement of the first communication device, the management target device is a device that is set so that repair, replenishment of expendable supplies, etc. are carried out by not only the user of the management target device but also a manager of a service company or a manufacturer.

Furthermore, the managing device is an information processing device placed at the manager for performing remote management of the management target device by collecting information (device information) of the management target device. More specifically, the managing device functions to arrange regular checking, replacement and replenishment of expendable elements, etc. by obtaining device information of the management target device, so as to operate a management target device in a stable state.

Furthermore, the first communication device is for transmitting such device information of the management target device to the managing device.

Furthermore, the first communication device is arranged so that a transmission processing section transmits device information of the management target device to the managing device by electric mail. The transmission processing section particularly converts device information into attached data in an attached file format and has the same contained in an electric mail to be transmitted to the managing device.

An electric mail is normally composed of mail data as a main body of an electric mail and attached data attached to the mail data. The mail data are data in a standard format (for instance, text format) set according to the electric mail system, and easily viewed by mail-dedicated software (mailer).

Further, the attached data are data in a format different from the standard format of electric mail systems, and are not viewed by means of generally-used mailers. In other words, attached data are made visible by means of software different from mailers, which are data less possibly perceived by the third party.

Thus, the first communication device is set so that device information is transmitted in the form of attached data that are less likely perceived by the third party. Therefore, it is possible to prevent leakage of device information.

Furthermore, to achieve the second object described above, a second information communication device in accordance with the present invention is an information communication device notifying a managing device of device information about a management target device by electric mail, that is arranged by comprising (1) an abnormality detecting section for detecting an abnormal state of the management target device, (2) an abnormality management table that lists abnormal states to be notified to the managing device, and (3) a transmission processing section that, in the case where an abnormal state detected by the abnormality detecting section is indicated in the abnormality management table, produces an abnormality report mail containing contents of the abnormal state, and transmits the abnormality report mail to the managing device.

The second communication device transmits device information of the management target device to the managing device by electric mail, as the first communication device does.

Furthermore, the second communication device is provided with an abnormality detecting section for detecting abnormality (error) of a management target device. The transmission processing section is set so as to produce an electric mail (abnormality report mail) containing contents of an abnormal state based on a result of detection by the abnormality detecting section.

The second communication device particularly is provided with the abnormality management table that lists abnormal states to be notified to the managing device. The table can be set for each management target device individually, by the user of the management target device or the manager.

Besides, the second communication device is set so as to transmit an abnormality report mail containing contents of an abnormal state detected by the abnormality detecting section to the managing device exclusively in the case where the abnormal state is listed in the abnormality management table. In short, the second communication device is set so as to selectively carry out notification of an abnormal state to the managing device, according to contents of the abnormal state.

This makes it possible to reduce the number of abnormality report mails to be sent to the managing device. Therefore, the manager is allowed to decrease management costs, while to make a prompt action (recovery of the management target device).

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view illustrating an arrangement of a device information mail that is sent from a digital complex machine in accordance with the present invention to a server, in a remote management system that the digital complex machine belongs to.

FIG. 4 is an explanatory view illustrating a remote management system that the digital complex machine shown in FIG. 2 belongs to.

FIG. 5 is an explanatory view illustrating another arrangement of a device information mail that is sent from the digital complex machine to a server in the remote management system shown in FIG. 4.

FIG. 6 is an explanatory view illustrating an error management table employed by a main CPU in the digital complex machine shown in FIG. 2.

FIG. 13 is an explanatory view illustrating an example of an electric mail used in a conventional remote management system.

DESCRIPTION OF THE PREFERRED EMBODIMENTS

First Embodiment

The following description will explain an embodiment of the present invention.

Figure 2:
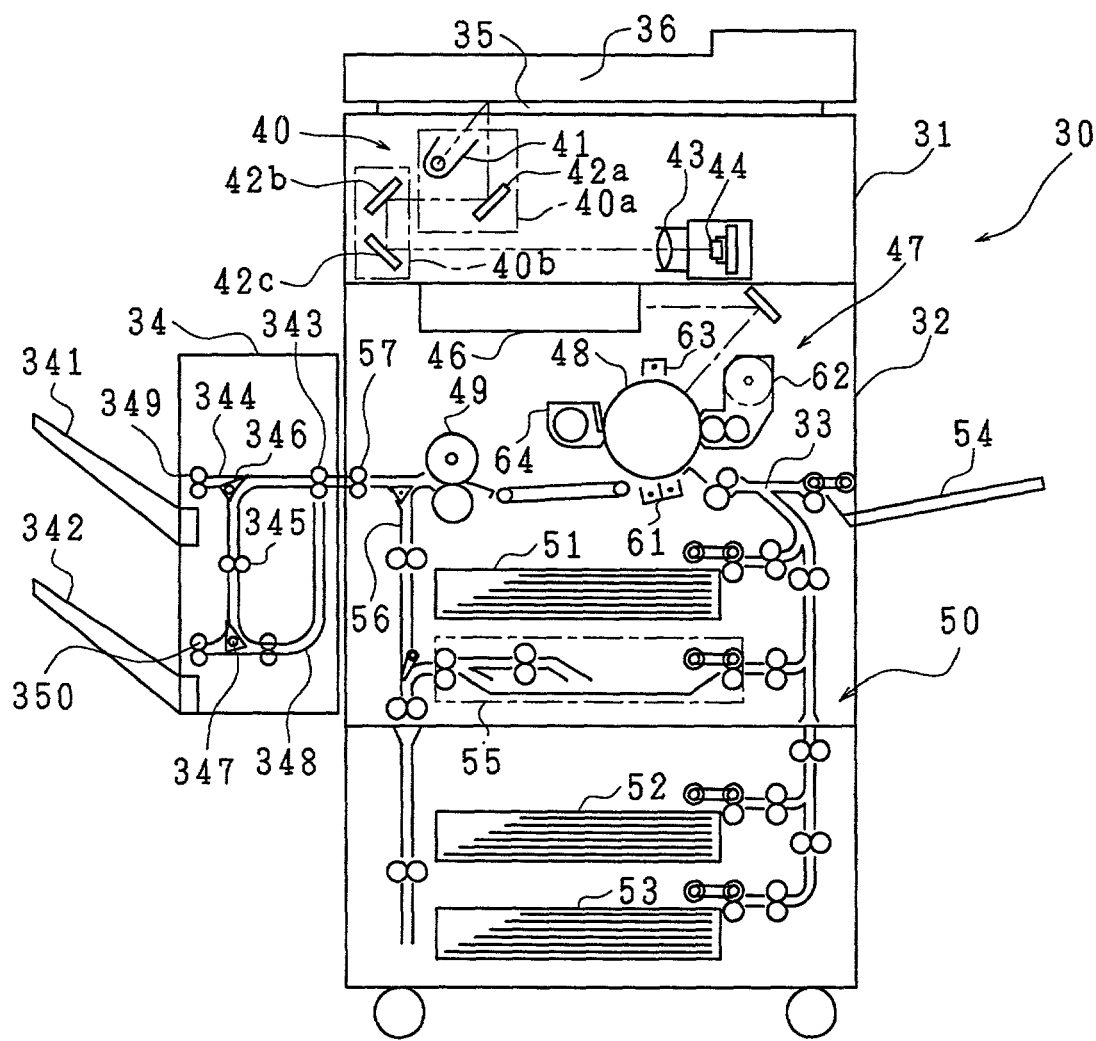
FIG. 2 is an explanatory view illustrating an arrangement of the aforementioned digital complex machine.

FIG. 2 is an explanatory view illustrating an arrangement of a digital complex machine 30 as an image forming device in accordance with the present embodiment. The digital complex machine 30 functions as a copying machine, a printer, and a facsimile machine, and is equipped with a scanner section 31 and a laser recording section 32 as shown in the figure.

The scanner section 31 is for reading an image on a sheet of an original document, and includes an original document platen 35 (hereinafter referred to as platen 35) made of transparent glass, as well as an RADF 36 and a scanner unit (SU) 40. With this arrangement, original sheets should be placed one by one on the platen 35 while images thereon should be successively read.

The RADF (recirculating automatic document feeder) 36 is an original document feeder in the digital complex machine 30, for transporting sheets of an original document set in a prescribed tray (not shown) one by one onto the platen 35. After reading an original image by the SU 40, the sheet is transported to a predetermined feed-out position.

Further, the RADF 36 also functions as a double-sided document recirculating automatic document feeder. More specifically, the RADF 36 includes a single-side-sheet transport path for use in reading of a single side, as well as a double-side-sheet transport path for use in reading of both sides, a guide for the switching of the transport paths, a group of sensors and control sections for checking states of original documents in the transport paths. This makes it possible to, after reading an original image, reverse a sheet and transport the same to the platen 35.

Incidentally, since each member of the RADF 36 is known, detailed description of the same is omitted in the present embodiment.

The SU 40 is an original image reading unit that reads, line by line, an original image on a sheet of an original document that has been transported onto the platen 35. Then, as shown in FIG. 2, it includes a first scanning unit 40a, a second scanning unit 40b, an optical lens 43, and a CCD 44.

The first scanning unit 40a is for irradiating the sheet by moving at a constant velocity V from left to right along the platen 35. As shown in FIG. 2, it includes a lamp reflector assembly 41 for irradiation, and a first reflection mirror 42a for guiding reflected light from the sheet to the second scanning unit 40b.

The second scanning unit 40b is arranged so as to move at a velocity of V/2 following to the first scanning unit 40a. It includes second and third reflection mirrors 42b and 42c for guiding reflected light from the first reflection mirror 42a to the optical lens 43 and the CCD 44.

The optical lens 43 is for converging light reflected by the third reflection mirror 42c onto the CCD 44. The CCD (charge-coupled device) 44 is for converting light converged by the optical lens 43 into electric signals.

The analog electric signals obtained by the CCD 44 are converted into image data of digital signals by a CCD board equipped with the CCD 44. The image data obtained are stored in a memory after being subjected to various kinds of image processing operations at an image processing section. Further, the electric signals are set so as to be transmitted by the laser recording section 32 in response to an output instruction of a main CPU that will be described later. Incidentally, the CCD board, the image processing section, and the memory will be described later.

The laser recording section 32 is for forming an image on a sheet (recording material) in accordance with the image data. As shown in FIG. 2, it includes a laser scanning unit (LSU) 46, an electrophotography processing section 47, an a sheet transport mechanism 50.

The LSU 46 projects laser light to a photosensitive drum 48 of the electrophotography processing section 47 in accordance with image data inputted from the external, to form an electrostatic latent image. The LSU 46 includes a semiconductor laser light source, a polygon mirror and an f-θ lens that deflects the laser light at a constant angular velocity. The f-θ lens is for correcting the laser light that has been deflected by the polygon mirror so that the light should be deflected at the constant angular velocity on a surface of the photosensitive drum 48.

The electrophotography processing section 47 includes a photosensitive drum 48, as well as a charger 63, a developer 62, a transferring/separating unit 61, a cleaning unit 64, and a discharger (not shown) provided around the photosensitive drum 48. The section 47 functions to generate a toner image by developing an electrostatic latent image on the photosensitive drum 48 that was formed by the LSU 46, and electrostatically transfers the toner image onto a sheet.

Incidentally, since each element of the LSU 46 and the electrophotography processing section 47 is known, detailed descriptions of the same will be omitted here in the present embodiment.

The sheet transport mechanism 50 functions to supply a sheet to the electrophotography processing section 47, fixing the image transferred onto the sheet, and discharging the sheet to the external. As shown in FIG. 2, it includes a transport section 33, cassette sheet feeders 51 through 53, a manual sheet feeder 54, a fixing unit 49, recirculating paths 55 and 56, discharge rollers 57, and a finishing device 34.

The transport section 33 is for transporting a sheet to a predetermined transfer position in the electrophotography processing section 47 (a position at which the transferring/separating unit 61 is disposed). The cassette sheet feeders 51 through 53 are for storing sheets on which images are to be transferred as well as for feeding the sheet to the transport section 33 for image transfer. The manual sheet feeder 54 is for supplying the transport section 33 with sheets of kinds other than those stored in the cassette sheet feeders 51 through 53.

The fixing unit 49 is for fixing a toner image transferred onto the sheet. The recirculating paths 55 and 56 are paths for recirculating the toner-image-fixed sheet to the transport section 33, so that another image should be formed on the other side of the sheet. Further, the finishing device 34 is provided on an outer side to the discharge rollers 57, which are on the downstream side to the fixing unit 49. The finishing device 34 is for finishing the discharged sheets, for instance, stapling.

As shown in FIG. 2, the finishing device 34 includes a first discharge tray 341 and a second discharge tray 342.

Further, in the finishing device 34, sheet receiving rollers 343, a first transport path 344, a second transport path 345, a first switching gate 346, a second switching gate 347, a third transport path (reversing path) 348, first discharge rollers 349, and second discharge rollers 350 are provided, so as to be responsive to various discharge modes.

Here, discharge modes in the finishing device 34 will be described below.

(First Discharge Mode)

A sheet discharged to the sheet receiving rollers 343 is directly discharged by the first discharge rollers 349 from the first transport path 344 to the first discharge tray 341.

(Second Discharge Mode)

A sheet discharged to the sheet receiving rollers 343 is guided by the first switching gate 346 to the second transport path 345, then, guided by the second switching gate 347 to the second discharge rollers 350. Then, it is discharged from the second discharge roller 350 to the second discharge tray 342.

(Third Discharge Mode)

A sheet discharged from the sheet receiving rollers 343 is guided by the first switching gate 346 to the second transport path 345, then, guided by the second switching gate 347 to the third transport path 348. When a rear end of the sheet passes the second switching gate 347, the sheet is switched back. In other words, the sheet is guided from the second switching gate 347 to the second discharge rollers 350, through which it is discharged to the second discharge tray 342. The switching back allows the switching of states of sheets discharged onto the second discharge tray 342 (face-down state, or face-up state).

Next, controlling operations of the digital complex machine 30 will be described below.

Figure 3:
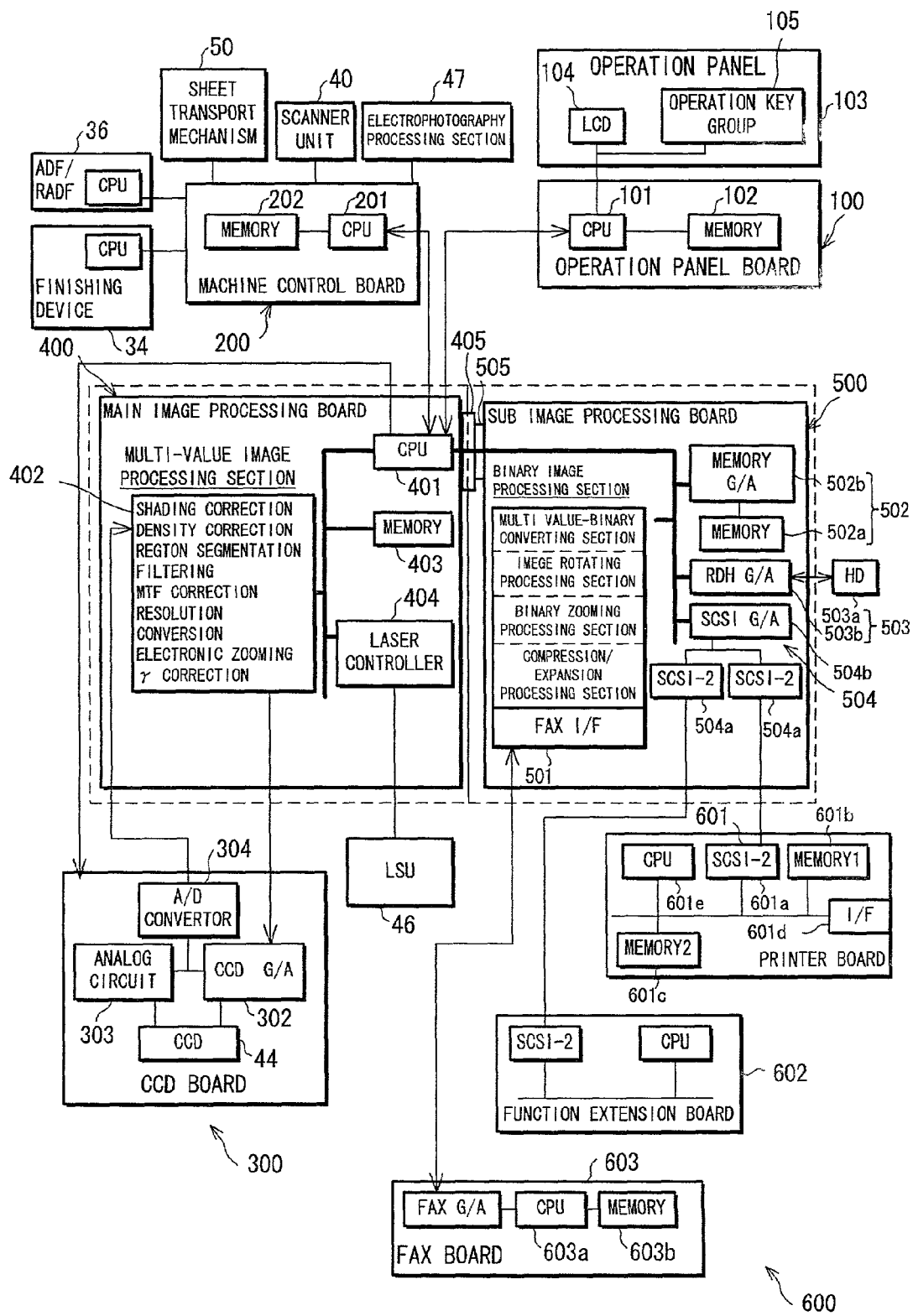
FIG. 3 is a block diagram illustrating a control system of a digital complex machine shown in FIG. 2.

FIG. 3 is a block diagram illustrating a control system of the digital complex machine 30. As shown by the figure, the digital complex machine 30 includes, in addition to the members shown in FIG. 2, an operation panel (OP) board 100, a machine control board (MC) 200, a CCD board 300, a main image processing board 400, a sub image processing board 500, and an extension board group 600.

These boards are for controlling respective members of the digital complex machine 30, as well as processing an image read by the scanner section 31. The following description will explain respective boards.

The main image processing board 400 applies an image processing operation to image data generated by the CCD board 300 that will be described later, and constitutes an image processing section of the digital complex machine 30.

More specifically, the main image processing board 400 includes a main CPU (central processing unit) 401, a multivalue image processing section 402, a memory 403, and a laser controller 404.

The multivalue image processing section 402 applies an image processing operation to image data transmitted from the CCD board 300 that will be described later, so as to form an image with desired tones. Incidentally, the image processing operations by the multivalue image processing section 402 are image processing operations to multivalue image data, such as shading correction, density correction, region segmentation, filtering, MTF correction, resolution change, electronic zooming (variable magnification), and γ correction.

The laser controller 404 is a transfer device for transmitting the image data having been subjected to an image processing operation to the LSU 46.

The main CPU 401 controls the multivalue image processing section 402 and the memory 403 to apply an image processing operation to image data.

Furthermore, the main CPU 401 functions as a core of the digital complex machine 30 that controls (controls operations of) respective members in the digital complex machine 30, in association with a plurality of sub CPUs incorporated in the other boards, the RADF 36, and the finishing device 34.

The memory 403 is a memory for storing image data having been subjected to image processing operations. The memory 403 also functions as a ROM (read only memory) for storing program data for various processing operations executed by the main CPU 401, such as procedure management data, control data, etc. regarding image processing, printing, etc. Furthermore, the memory 403 also functions to store peculiar information of the digital complex machine 30 (name, serial number, etc. of the machine).

The sub image processing board 500 is another image processing section for applying further image processing operations to the image data that has been subjected to image processing operations by the main image processing board 400. As shown in FIG. 3, the sub image processing board 500 includes a binary image processing section 501, a memory section 502, a hard disk device 503, and an interface section 504.

The binary image processing section 501 binarizes image data (converts image data into binary data) that have been subjected to image processing operations by the main image processing board 400, and applies further image processing operations to the binary image data. As shown in FIG. 3, the binary image processing section 501 includes a multivalue-binary converting section for converting multivalue image information into a binary image, an image rotating section for rotating an image, a binary zooming section for performing variable magnification processing operations with respect to a binary image, and a compression/expansion processing section that performs compression/expansion processing.

Furthermore, a facsimile interface (FAX-I/F) for facsimile communication is also provided in the binary image processing section 501. Furthermore, the binary image processing section 501 is connected with the main image processing board 400 via a connector, and is controlled by the main CPU 401.

The memory section 502 is for storing binary image data processed by the binary image processing section 501 and control data regarding image processing, and includes a page memory 502a, a gate array (memory G/A) 502b for controlling a page memory 502a.

The hard disk device 503 is for storing massive image data, and includes a disk memory (HD) 503a, a gate array (RDH-G/A) 503b for controlling the disk memory 503a.

The interface section 504 has SCSI terminals (SCSI-1, SCSI-2) 504a as external interfaces, and a gate array 504b for controlling the SCSI terminals.

The OP board 100 shown in FIG. 3, upper right, is for management and control of the operation panel 103 of the digital complex machine 30. More specifically, as shown in FIG. 3, an LCD section 104 and an operation key group 105 for entering the user's instructions are provided in the operation panel 103 of the digital complex machine 30. Furthermore, the OP board 100 is provided with a sub CPU 101 for controlling and managing the LCD section 104 and the operation key group 105.

Further, the OP board 100 also includes a memory 102 for storing various kinds of control information regarding the operation panel 103, such as instruction data from the operation key group 105, information to be displayed on the LCD section 104, etc.

Furthermore, the sub CPU 101 functions to perform control data communication with the main CPU 401 and to send the user's instruction data to the main CPU 401. Furthermore, from the main CPU 401, control data indicating an operation state of the digital complex machine 30 to the sub CPU 101. Then, the sub CPU 101 causes the LCD section 104 to display the operation state of the digital complex machine 30.

The MC board 200 shown in FIG. 3, upper left, is provided with a sub CPU 201 and a memory 202, to control the RADF 36, the scanner section 31, the electrophotography processing section 47, the recirculating path (double-side-sheet unit) 55 and the finishing device 34.

Furthermore, the sub CPU 201 functions to cause the memory 202 to store history data that are composed of operation history (a count of a counter, etc.) of the foregoing elements and trouble history (kinds and number of times of paper jams, etc.).

The CCD board 300 shown in FIG. 3, lower left, is provided with the CCD 44 shown in FIG. 2, and generates image data made from electric signals in accordance with light reflected from an original document sheet.

Then, as shown in FIG. 3, the CCD board 300 is, in addition to the CCD 44, provided with a CCD gate array 302 for driving the CCD 44, an analog circuit 303, and an A/D converter 304. Here, the analog circuit 303 is provided for performing gain adjustment of an analog output from the CCD 44. Besides, the A/D converter 304 is provided for generating image data of digital signals based on the analog output. Control and management of the respective elements of the CCD board 300 is carried out by the main CPU 401 in the main image processing board 400.

The extension board group 600 is a board group composed of a printer board 601, a FAX board (facsimile board) 603, and a function extension board 602 that are connected with the sub image processing board 500.

The function extension board 602 extends editing functions of the digital complex machine 30 so that the characteristics of the digital complex machine 30 should be fully utilized. The FAX board 603 is provided with a sub CPU 603a and a memory 603b, and functions to perform facsimile transmission of image data generated by the CCD board 300 to the external, as well as functions to control the laser recording section 32 so as to cause the same to output image data received through facsimile. Further, the sub CPU 603a also functions to store the history information regarding transmission/reception of facsimiled data in the memory 603b.

The printer board 601 causes the digital complex machine 30 to function as a printer. As shown in FIG. 3, the printer board 601 is provided with a SCSI terminal 601a, a first memory 601b, a second memory 601c, a network I/F 601d, and a sub CPU 601e.

The SCSI terminal 601a is an interface that connects the printer board 601 with the sub image processing board 500. The first memory 601b is a memory device for temporarily storing image data transmitted from the external. The network I/F 601d is an interface that connects the digital complex machine 30 with the network N. The second memory 601c is a memory for storing various kinds of control programs used by the sub CPU 601e.

The sub CPU 601e functions to control the network I/F 601d, to cause the first memory 601b to store image data transmitted through the network N, and to transmit the image data to the sub image processing board 500 by controlling the SCSI terminal 601a.

Further, the sub CPU 601e also functions to store history information regarding reception/transmission of image data in the first memory 601b. Moreover, the sub CPU 601e produces a device information mail (abnormality report mail) that contains device information about the digital complex machine 30 and sends the same to a server 12 of a head office E via the network I/F 601d and the external network; these functions of the sub CPU 601e will be described later.

Next, the image data processing operation by the digital complex machine 30 will be described below, with regard to the copy mode, the facsimile mode, and the printer mode.

[Copy Mode]

This mode is a mode for outputting data of an original document read by the scanner section 31 onto sheets by means of the laser recording section 32. In this mode, the user sets an original document at a predetermined position on the RADF 36. The original document thus set is supplied onto the original document platen 35 sheet by sheet sequentially b7 the RADF 36. Then, the CCD 44 and the SU 40 of the CCD board 300 read images of each sheet of the original document, and produce 8-bit image data that are transferred to the main image processing board 400.

The multivalue image processing section 401 of the main image processing board 400 applies predetermined multivalue image processing operations such as γ correction to the 8-bit image data, and transfers the processed data to the LSU 46 of the laser recording section 32 via the laser controller 404. Through this process, the original document image read by the scanner section 31 are outputted as a copied image in gray scale from the laser recording section 32.

Incidentally, the 8-bit image data having been subjected to multivalue image processing may be further subjected to binarization (electronic RDH function). More specifically, in this case, the image data are sent to the sub image processing board 500 via the connectors 405 and 505. Then, the multivalue-binary converting section of the binary image processing section 501 converts the 8-bit image data into 2-bit image data.

Incidentally, the binary image processing section 501 is set so as to apply error diffusion to image data. The reason why the error diffusion is carried out is that satisfactory image quality is not obtained by simple multivalue-to-binary conversion in some cases, and this aims to avoid deterioration of image quality. Furthermore, the aim to convert the image data from the 8-bit form into the 2-bit form is to reduce a size of image data.

The 2-bit image data generated by the binary image processing section 501 are stored sheet by sheet of the original document in a disk memory in the hard disk device 503. Then, after image data of all the sheets of the original document set in the RADF 36 are stored in the disk memory, the gate array 503a reads image data stored in the disk memory repeatedly a set number of times which corresponds to the designated number of copies to be produced, and sends the read image data through the connectors 405 and 505 to the main image processing board 400.

Then, the image data, after subjected to the γ correction and other processing operations, are sent via the laser controller 404 to the LSU 46, where they are outputted as copied images.

Incidentally, in the above description, it is described as if after all the image data of the original document are stored, the images would be outputted. However, the images may be outputted each time a predetermined number of sets of image data are stored.

[Facsimile Mode]

Operations in the facsimile mode are classified into a transmission mode and a reception mode. The transmission mode will be first described below.

The transmission mode is a mode for facsimile transmission of image data of the original document read by the scanner section 31 to an external destination of communication. In this mode, like in the copy mode, the original document is read and image data are generated, then binarized. The image data thus converted into binary data are compressed in a predetermined form, and stored in the memory section 502.

When a communication line with the destination of communication is ensured by the FAX board 603, the image data are read from the memory section 502 and transferred to the FAX board 603 side. Then, after they are subjected to necessary processing such as change in the compression form in the FAX board 603, they are sequentially transmitted to the destination of communication.

The following description will describe the reception mode. The reception mode is a mode for outputting image data transmitted from an external destination of communication by means of the laser recording section 32. In this mode, the FAX board 603 receives image data compressed in a predetermined form via a communication line, and transmits the same to the sub image processing board 500. The sub image processing board 500 receives image data through a facsimile interface of the binary image processing section 501. Then, the compression/expansion processing section of the binary image processing section 501 expands the image data to reproduce the same in a page-unit form, then sends the same to the main image processing board 400.

After subjected to the γ correction in the main image processing board 400, the data are transferred to the LSU 46 of the laser recording section 32 via the laser controller 404. This allows output of images in gray scale by laser recording, based on image data received from the external by facsimile.

[Printer Mode]

The printer mode is a mode in which image output by the laser recording section 32 is made in accordance with print job (print instruction data including image data) that is sent from an external apparatus.

In this mode, image data for a print job are developed into raster images as page-unit images by the sub CPU 601e of the printer board 601, and are stored in the first memory 601b. The image data thus developed are transferred via the SCSI terminal 601a to the sub image processing board 500, where they are stored in the hard disk device 503.

After the image data are read in a predetermined page order and are sent to the main image processing board 400, where they are subjected to the γ correction, the data are transferred via the laser controller 404 to the LSU 46 of the laser recording section 32. By so doing, the image data transmitted from a personal computer can be outputted by the laser recording section 32 as printer images in gray scale.

Incidentally, in the printer mode, binary image processing by the sub image processing board 500 cannot be carried out. In other words, the image data transferred to the sub image processing board 500 are temporarily stored in the hard disk device 503, then simply transferred to the main image processing board 400.

Next, a remote management system for the digital complex machine 30 will be described below. The digital complex machine (management target device) 30 arranged as above is sold or rent to a user so as to be used at a store, an office, home, etc., and is set so that maintenance (repair of a broken part, replenishment of expendable supplies, etc.) is carried out by a service company specialized for the foregoing purpose.

The service company is to, regularly or whenever required, check the information (device information) of the digital complex machine 30 so that maintenance suitable for conditions of the machine should be carried out. Note that the device information is information indicative of a state of use (the number of copied sheets, etc.), a state of trouble (a kind of trouble, history of occurrence of trouble, etc.) of the digital complex machine 30.

More specifically, the service company carries out regular checking, replacement and replenishment of expendable elements, etc. by managing the device information of the digital complex machine 30, so that operation environments for the digital complex machine 30 are desirably settled.

Furthermore, each of the digital complex machine 30 and the service company is provided with a remote management system, so as to send/receive device information. This is a system for providing a manager in the service company with information about each digital complex machine 30 via predetermined communication lines.

Figure 4:
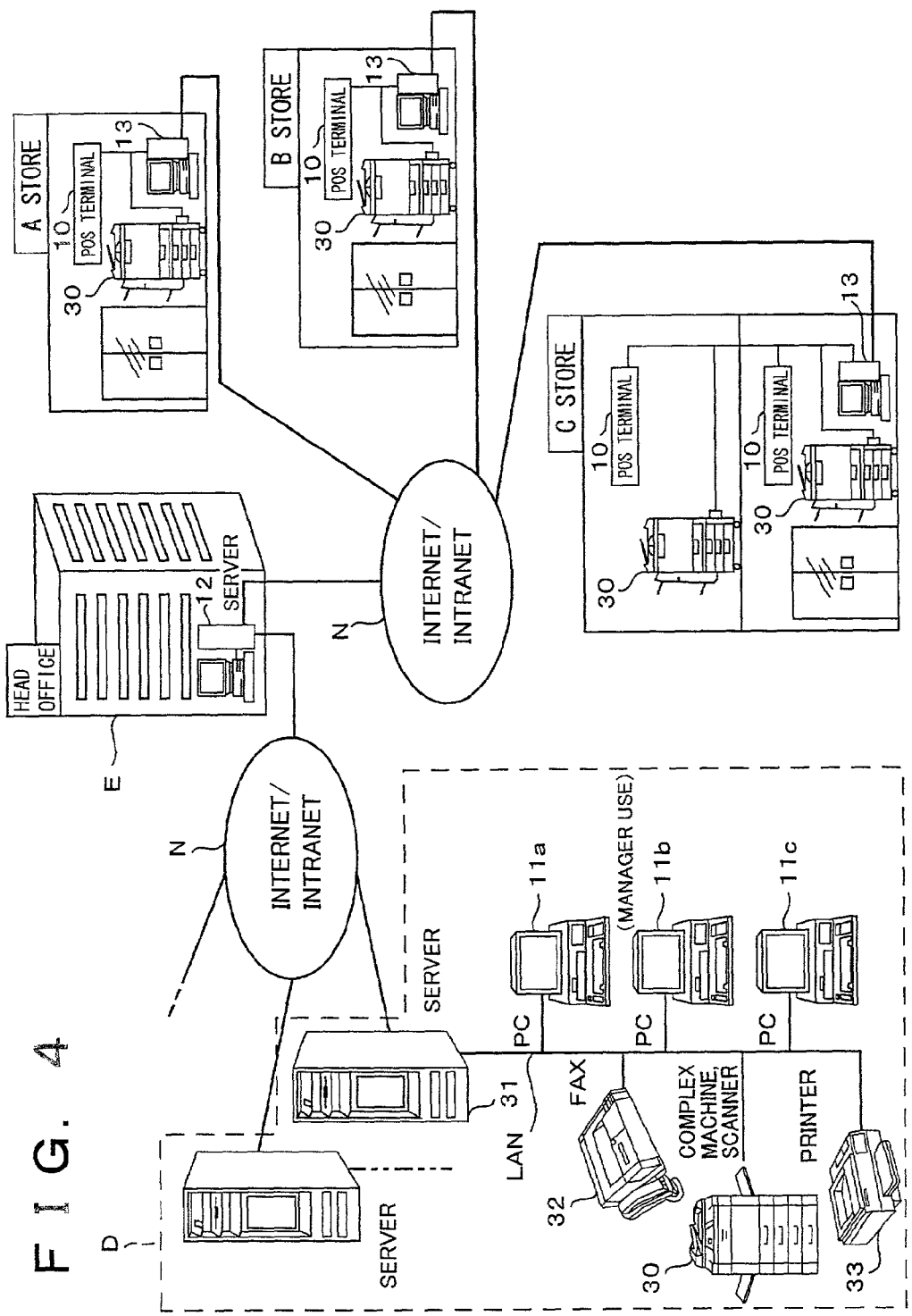

FIG. 4 is an explanatory view illustrating an arrangement of a remote management system (present system) in accordance with the present embodiment.

As shown in the figure, the present system is arranged so that stores A through C and an office D that are users of digital complex machines 30 are connected with a head office E of a service company that manages the foregoing digital complex machines 30 via a network N (internet/intranet).

As shown in FIG. 4, the stores A and B possess, in each, one digital complex machine 30 and one POS terminal 10 as well as a PC (personal computer) 13 connected thereto. The store C possesses two digital complex machines 30 and two POS terminals 10 as well as a PC 13 connected with them.

The PCs 13 function as information processing devices used in the stores A through C, while the POS terminals 10 function as terminals of a POS (point of sales) system to which the stores belong to. Note that the PCs 13 and the POS terminals 10, along with the digital complex machines 30, are connected with the network N.

The office D has a local area network (LAN) formed with a digital complex machine 30, PCs 11a through 11c, a server 31, a facsimile machine (FAX) 32, a printer 33, etc. The LAN is connected with the network N via the server 31. The PC 11a is dedicated to a manager who manages all the OA devices in the office.

The head office E is a service company that manages the digital complex machines 30, provided with a server (managing device) 12 for managing the respective users' digital complex machines 30. The head office E is to collect device information about each digital complex machine 30 by means of the server 12, based on which the head office E carries out repair, replenishment of expendable supplies, etc. for the digital complex machines 30, as well as issuance of relevant documents (bills, etc.) to the users.

Table 1 shows device information of the digital complex machine 30 collected by the server 12. As shown in the table, the device information collected by the server 12 includes basic information indicative of a name of the machine, etc., a state of use indicative of counts of counters, etc., a state of trouble indicative of information such as a kind of trouble and history of occurrence of trouble.

TABLE 1

| | |
|---|---|
| BASIC INFORMATION | NAME OF MACHINE, TYPE OF MACHINE, SERIAL NUMBER, OPTION, ROM VERSION, TRANSMISSION TIME |
| STATE OF USE | TOTAL COUNTER, COPY COUNTER, PRINT COUNTER, ZAURS COUNTER, SCAN COUNTER, OTHER COUNTERS, FAX TRANSMISSION TIME, FAX RECEPTION TIME, FAX TRANSMISSION COUNTER, FAX PRINT COUNTER, DF/SP COUNTER, STAPLE COUNTER, DOUBLE-SIDE COUNTER, SECTION COUNTER (COPY), SECTION COUNTER (PRINT), COUNTERS FOR EACH FEEDER, COUNTERS FOR EACH PAPER SIZE, JAM COUNTER, JAM HISTORY, TROUBLE COUNTER, TROUBLE HISTORY, TONER EMPTY HISTORY, MAINTENANCE COUNTER, DEVELOPER COUNTER, DRUM COUNTER, PROCESS CONTROL COUNTER, FAX COMMUNICATION MANAGEMENT, SCANNER TRANSMISSION MANAGEMENT |
| STATE OF TROUBLE | TROUBLE, MAINTENANCE TIME, TONER EMPTY, TONER LOW, PAPER EMPTY, PAPER LOW, WASTE TONER FULL, JAM, NO STAPLES, DISCHARGE PAPER TRAY FULL, DOOR OPEN |

Furthermore, device information is sent by E-mail from each digital complex machine 30 to the server 12 of the head office E.

Here, E-mails containing device information (device information mail) sent from the digital complex machine 30 to the server 12 will be described in detail.

The device information mail is regularly sent to the server 12 by the main CPU 401 of the main image processing board 400 and the sub CPU 601e of the printer board 601. More specifically, the main CPU 401 and the sub CPU 601e are set so that at every predetermined time the main CPU 401 should collect device information of the digital complex machine 30 and that the sub CPU 601e should make a device information mail based on the collected device information, to send the mail to the server 12 of the head office E.

In collection of device information, the main CPU 401 reads peculiar information of the digital complex machine 30 from the memory 403 while obtains the time from a clock (not shown), to produce basic information of the device information Then, the main CPU 401 controls the sub CPU 201 of the MC board 200 so as to make the same read, from the memory 202, history data of the finishing device 34, the RADF 36, the scanner unit (SU) 40, the electrophotography processing section 47, and the sheet transport mechanism 50.

Further, the main CPU 401 controls the sub CPU 601e and the sub CPU 603a in the printer board 601 and the FAX board 603 so as to cause the same to read history data regarding reception of print jobs (image data) and transmission/reception of facsimiles.

The main CPU 401 is also set so as to make a report on the state of use and the state of trouble in the device information, based on the history data thus obtained.

Thereafter, the main CPU 401 compiles the basic information, state of use, and state of trouble as shown in Table 1, and sends the same to the sub CPU 601e of the printer board 601.

The sub CPU 601e makes a device information mail based on the device information sent thereto, and controls the network I/F 601d so as to cause the same to transmit the mail to the server 12 at the head office E.

Figure 1:

FIG. 1 is an explanatory view illustrating a device information mail produced by the sub CPU 601e. The device information mail is comprised of a header Ml indicative of a destination and a title, mail data M2, and attached file data (attached data) M3.

The mail data M2 are document data composed of basic information shown in Table 1, which are data in a text format set according to an E-mail system.

Further, the attached data M3 are data containing a state of use and trouble information. The attached data M3 are data produced by converting the state of use and trouble information according to a dedicated program for the present system. Therefore, the attached data M3 cannot be read by a computer that does not possess the program.

More specifically, in the present system, the sub CPU 601e is set so as to produce a device information mail by converting a part of the device information into attached data M3 that are less likely perceived by the third party, to send the produced mail to the server 12. This arrangement enables prevention of leakage of information, even in the case where a device information mail is intercepted by a hacker or the like.

Furthermore, in the present system, the sub CPU 601e is set so as to convert information indicative of a state of use and a state of trouble of the digital complex machine 30 into attached data.

The state of use such as a count of a counter is information according to a quantity of jobs on the user side, and hence confidential information that the user does not wish to let the third party to know. Furthermore, the state of trouble such as paper jam history is also confidential information that the user does not disclose to the third party. Therefore, in the present system, such information can be adequately protected by converting the state of use and the state of trouble into attached data M3 before sending the same.

Furthermore, the attached data M3 are preferably composed of data compressed at a higher rate than that of text data. By sending a part of device information in the form of the attached data M3, improvement of transmission efficiency (in terms of time and cost for transmission of information) can be achieved.

Incidentally, in the present embodiment, the sub CPU 601e in the printer board 601 is arranged so as to convert a state of use and a state of trouble into attached data M3 according to a dedicated program for the present system. The method for producing the attached data is, however, not limited to this.

For instance, a state of use and a state of trouble may be arranged so as to be converted to attached data M3 by a generally-used software available in the market. In such an arrangement, since the attached data M3 are still more difficult to be perceived as compared with mail data M2, it is possible to protect the state of use and the state of trouble. Further, the foregoing arrangement also provides an advantage of facilitating production of attached data.

Furthermore, protection of attached data M3 may be intensified so as to prevent contents of data from being easily intercepted, by arranging the sub CPU 601e so as to encode attached data M3 and attach the same to mail data M2. The encoding may be implemented by using the public-key algorithm or the digital signature.

Furthermore, in the present embodiment, the sub CPU 601e of the printer board 601 is set so as to convert a state of use and a state of trouble of the digital complex machine 30 into attached data M3. Information to be converted to the attached data is not limited to a state of use and a state of trouble, but any information may be selected and converted.

Further, the sub CPU (information selecting section) 601e may be arranged so as to select information to be transmitted to the server 12 from among device information transmitted from the main CPU 401, and to produce a device information mail based on selected information. Further, the main CPU (information selecting section) 401 may be set so as to transmit information that should be sent to the server 12 to the sub CPU 601e.

Further, the sub CPU 601e may be set so as to select information that should be converted to attached data M3, in response to an instruction from the server 12 at the head office E that is supplied through the network I/F 401d or an instruction that is directly inputted to the operation panel 103 (see FIG. 3) of the digital complex machine 30. This allows information requested by the manager at the head office E or the user to be converted into attached data M3 and transmitted.

Further, in the case where a PC 11a for managing OA apparatuses is provided in LAN, like at the office D shown in FIG. 4, the sub CPU 601e (or the main CPU 401) is preferably set so as to send device information not only to the head office E but also to the PC 11a.

The foregoing setting enables the user-side responsible person to grasp information of the digital complex machine 30 used in the office D as the manager at the head office E. Further, it also enables the user-side manager to easily check relevant documents (bills and the like) issued by the head office E.

Furthermore, in the present embodiment, device information mail that contains device information of the digital complex machine 30 is to be produced and sent by the main CPU 401 and the sub CPU 601e in the digital complex machine 30.

However, the present invention is not limited to the above, and a device information mail may be produced and sent by another sub CPU provided in the digital complex machine 30, or a PC 13 (or any one of PCs 11a through 11c) connected with the digital complex machine 30.

Further, in the case where the device information mail is produced and sent by the PC 13, sets of data M1 through M3 may be produced using software available from the market that is installed in the PC 13. Further, also preferable is a method in which a dedicated program for producing attached data M3 is installed therein and attached data M3 containing a state of use and a state of trouble is produced using the same.

Furthermore, in the case where not less than two of digital complex machines 30 are provided, as in the store C shown in FIG. 4, device information of them may be sent all together by a PC 13 connected with them.

FIG. 5 is an explanatory view illustrating an example of a device information mail transmitted in this case. In this example, the PC 13 makes information about No. 1 and No. 2 of digital complex machines 30 be contained in a same device information mail. Incidentally, as shown in FIG. 5, the PC 13 is set so as to store respective positions where the digital complex machines 30 are located and to describe the positions in the mail data M2.

This setting enables the manager at the head office E to grasp information of all the digital complex machines 30 set in the store C all together, hence to efficiently issue relevant documents, thereby resulting in enhancement of services. Furthermore, since it is possible to determine necessity of regular checking and replenishment of expendable supplies regarding each store (each area), the number of times of visit to the store C can be reduced.

Incidentally, in the present embodiment, a device information mail is to be regularly sent from the digital complex machine 30 to the server 12. The setting, however, is not limited to this, and it is preferable that device information should be sent by E-mail when the digital complex machine 30 becomes in a certain prescribed state (abnormal state) and when the server 12 requests device information.

Furthermore, transmission of a device information mail when the digital complex machine 30 becomes in an abnormal state will be depicted in the description of a second embodiment below.

Second Embodiment

The following description will depict a second embodiment of the present invention. Incidentally, the members having the same structure (function) as those in the above-mentioned embodiment will be designated by the same reference numerals and their description will be omitted.

The following description will explain transmission of E-mails when an error (abnormal state, trouble) occurs to the digital complex machine 30.

The main CPU (abnormality detecting section) 401 has a function to regularly conduct self-checking regarding occurrence of errors, by regularly inspecting respective functions of component elements of the digital complex machine 30. Furthermore, the main CPU 401 has a function to detect errors whenever they occur in operations of the digital complex machine 30.

Furthermore, the main CPU 401 is set so as to stop operations of the digital complex machine 30 when detecting any error, to determine a type (content) of the error, and to display the same on the LCD section 104 of the operation panel 103.

Then, the main CPU 401 makes the digital complex machine 30 operable when the error is corrected by the user.

Besides, the main CPU (transmission processing section) 401 is set so as to control the sub CPU 601e, to cause the same to produce an E-mail (abnormality report mail) for reporting occurrence of an error and to send the same to the server 12 at the head office E.

Furthermore, the main CPU 401 is also set so as to determine whether or not an abnormality report mail should be sent, depending on a type of an error that has occurred.

FIG. 6 is an explanatory view illustrating an error management table T1 employed by the main CPU 401. As shown in the figure, the main CPU 401 is set so as to, together with the sub CPU 601e, produce and send an abnormality report mail when an error of a kind has occurred that is designated as "reported" according to the error management table. On the other hand, the main CPU 401 is set so as not to send an abnormality report mail when detecting an error of a kind that is designated as "non-reported".

Incidentally, contents (designation of errors as "reported" or "non-reported") of the error management table T1 are to be set by each user of the digital complex machine 30 individually.

Figure 7:
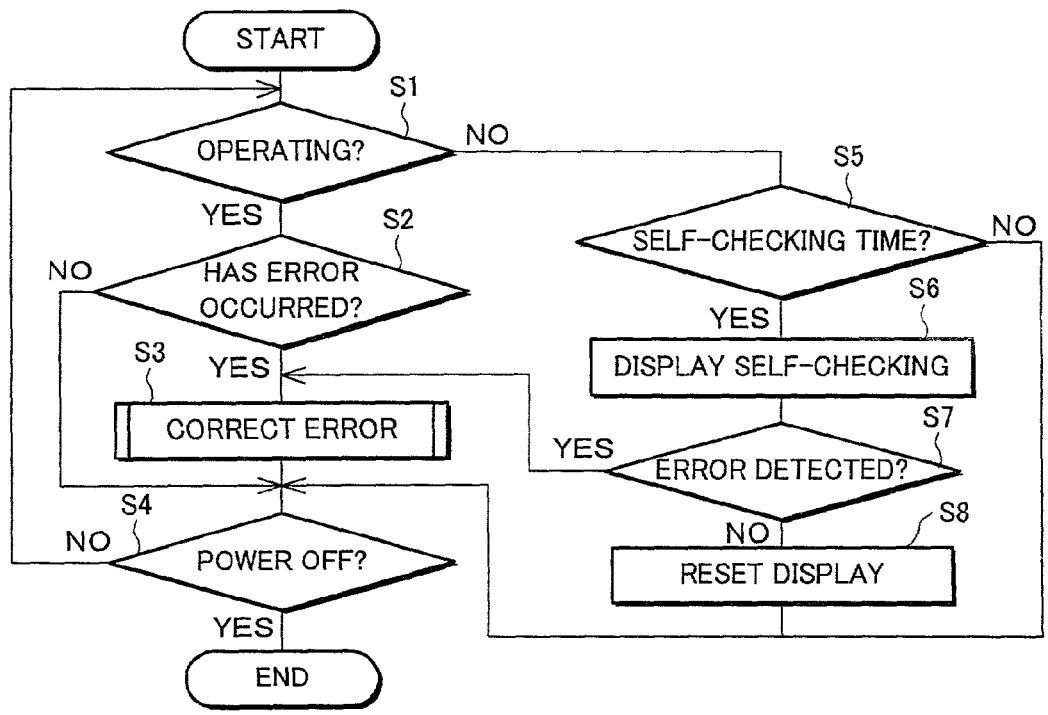
FIG. 7 is a flowchart illustrating a flow of an error detecting operation in the main CPU described above.

Here, operations of the main CPU 401 relating to error detection will be explained. FIG. 7 is a flowchart showing a flow of the foregoing operations. As shown in the figure, the main CPU 401 is set so as to conduct an error detecting operation in the digital complex machine 30, during an operation of the digital complex machine 30 or at a self-checking time.

Then, in the case where an error occurs during an operation of the digital complex machine 30 (S1, S2), or in the case where an error is detected during self-checking (S5 through S7), error correction that will be described later is carried out (S3).

Incidentally, operations related to the error detection are continuously carried out until the digital complex machine 30 is powered off. The main CPU 401 carries out self-checking (S7), and the LCD section 104 is arranged so as to indicate that self-checking is being conducted (S6, S8).

Figure 8:
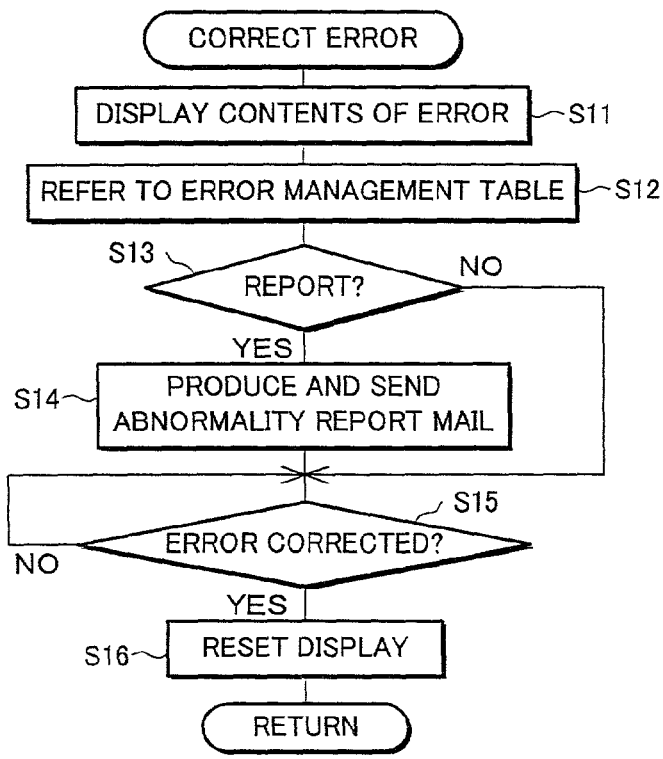
FIG. 8 is a flowchart illustrating flow of error correction in the error detecting operation shown in FIG. 7.

Subsequently, error correction shown in S3 is described. FIG. 8 is a flowchart illustrating a flow of error correction. As shown in the figure, the main CPU 401 is set so as to, upon detecting an error, determine contents of the error and display the same on the LCD section 104 (S11).

Thereafter, referring to an error management table T1 shown in FIG. 6, the LCD section 104 determines whether the detected error is an error designated as "reported" or "non-reported" (S12, S13). Then, in the case where it is designated as "reported", the main CPU 401 transmits the contents of the error to the sub CPU 601e of the printer board 601.

In response to this, the sub CPU 601e produces an abnormality report mail containing contents of the error transmitted, and controls the network I/F 601d, to send the mail to the server 12 at the head office E (S14).

Thereafter, the main CPU 401 becomes in a stand-by state until an error is corrected. Then, after confirming that the error is corrected, the display of the LCD section 104 is reset (S16), with which the processing operation ends.

As described above, the digital complex machine 30 is arranged so that the main CPU 401 detects an error that has occurred during an operation or during self-checking. The main CPU 401 and the sub CPU 601e produce an abnormality report mail containing contents of an error and send the same to the server 12 at the head office E.

This enables the manager at the head office E to immediately recognize the contents of the error that has occurred to each digital complex machine 30, thereby allowing him/her to take appropriate and prompt actions against the error.

Furthermore, the digital complex machine 30 is set so that the main CPU 401 determines whether or not an abnormality report mail should be sent regarding an error that has occurred, referring to the error management table T1.

More specifically, the digital complex machine 30 is arranged not to send an abnormality report mail in the case where an error that has occurred is a small error that can be easily corrected by the user, such as TONER EMPTY (TONER SHORTAGE), TRANSPORT JAM (PAPER JAM), PAPER SHORTAGE (NO PAPER), while to automatically send an abnormality report mail in the case where the machine 30 becomes in an abnormal state that cannot be corrected by the user, such as power-up failure, short circuit, damages to the control system, and the like.

This enables to prevent transmission of many unnecessary abnormality report mails to the server 12 at the head office E. The manager of the head office E has to cope with only errors that are difficult for the user to correct, and hence, the management cost can be reduced while prompt actions (recovery of the digital complex machine 30) can be taken.

Further, the digital complex machine 30 is set so that the contents of the error management table T1 shown in FIG. 6 (the designation of "reported" and "non-reported" regarding each error) can be set for each digital complex machine 30 by the user individually. This enables determination on whether or not an abnormality report mail should be transmitted, according to a level of each user's skills, thereby allowing the manager at the head office E to carry out maintenance service according to a level of each user's skill.

Incidentally, normally, in the case where an error occurs during an operation of the digital complex machine 30, the error, if small, can be corrected by the user, and therefore the correction of the error takes only short time. On the other hand, if the error is significant, it is difficult for the user to correct the same completely. Therefore, the error remains uncorrected for a long time, or even if once corrected, is occurs again soon.

Here, in the case of an arrangement in which an abnormality report mail is transmitted every time an error is detected, an abnormality report mail having the same contents is possibly transmitted repeatedly.

Figure 9:
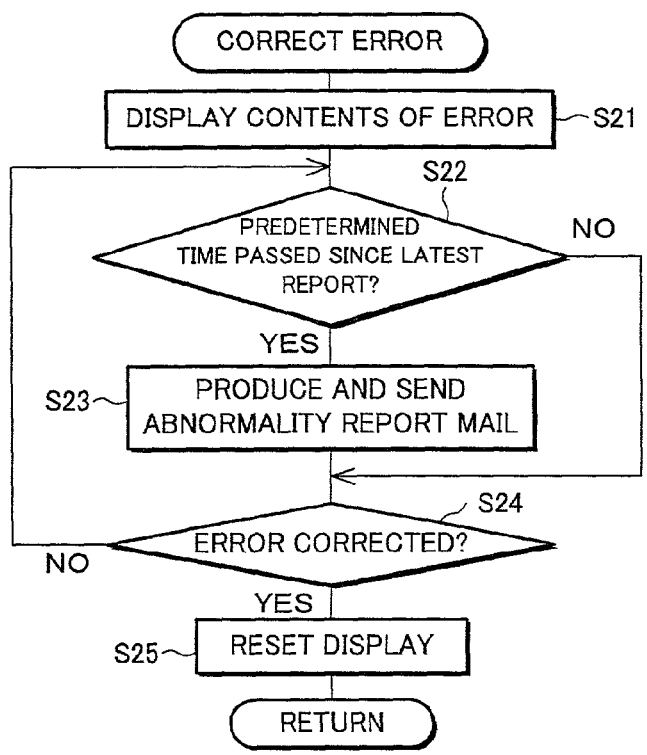
FIG. 9 is a flowchart illustrating another flow of error correction in the error detecting operation shown in FIG. 7.

Therefore, instead of the error correction shown in FIG. 8, a processing operation shown in FIG. 9 may be carried out, so as to determine whether or not an abnormality report mail should be transmitted, according to a time of the latest transmission of an abnormality report mail. In the case where the same error state (an identical error state) is detected within predetermined time since an abnormality report mail was transmitted last time, transmission of an abnormality report mail is preferably to be refrained.

More specifically, in the error correction shown in FIG. 9, the main CPU 401 displays contents of an error (S21), remains in a stand-by state until the error is corrected, and resets the display of the LCD section after the correction of the error (S24, S25). While being in the stand-by state, the main CPU 401 determines a time that has passed since the latest transmission of an abnormality report mail, and transmits an abnormality report mail when the time having passed exceeds predetermined time (S22, S23).

In this error correction, only one abnormality report mail is transmitted within predetermined time, in both the cases where a small error continuing for a short time occurs and where an error continuing for a long time occurs. Therefore, it is possible to prevent repeated transmission of an abnormality report mail resulting from the same error, even if the user fails to promptly correct the error (trouble). This enables to avoid transmission of many unnecessary abnormality report mails to the manager.

Further, in this error correction, in the case where an extremely long-lasting, significant error occurs, or in the case where the user does not notice abnormality, an abnormality report mail is transmitted a plurality of times. Therefore, the manager can easily confirm that an extremely significant abnormal matter has occurred, or that the user has not noticed an abnormal matter.

Furthermore, in the error correction shown in FIG. 9, in the case where an error is extremely significant, transmission of a plurality of abnormality report mails to the server 12 may be preferable, to attract the manager's attention.

Therefore, the length of the predetermined time (time for determining whether or not an abnormality report mail should be transmitted again) is preferably adjusted by the main CPU 401 according to the content of the noticed error. More specifically, in the case where an error is serious, the main CPU is preferably arranged so as to set the predetermined time short, and to promote re-transmission of an abnormality report mail. This causes an abnormality report mail to be transmitted a plurality of times at short intervals when a significant error has occurred, thereby enabling the manager to more easily confirm that the significant abnormal matter has occurred to the digital complex machine 30.

Furthermore, as described above, in the case where an error that has occurred to the digital complex machine 30 is small, the error can be corrected easily by the user, and hence, the error correction takes only short time. Therefore, in the case where an error is such that correction of the same takes only short time, informing the server 12 can be considered as unnecessary.

Figure 10:
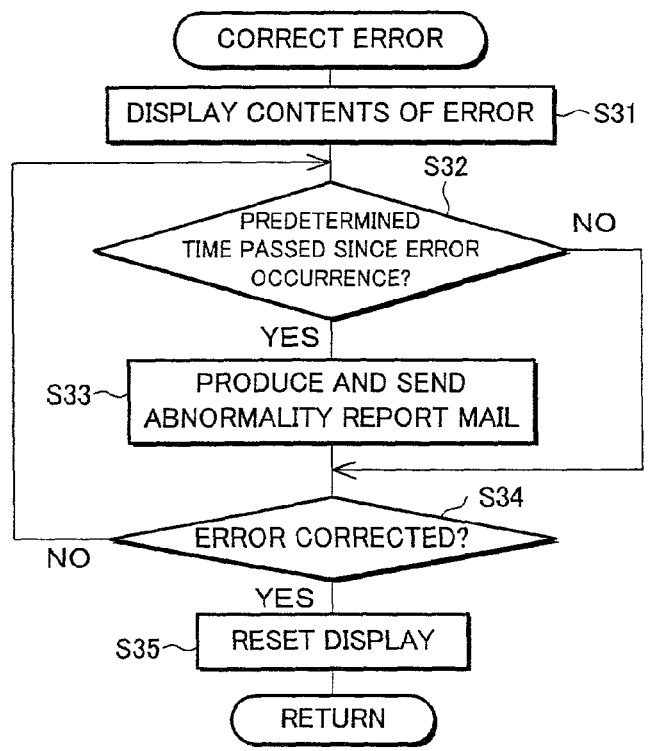
FIG. 10 is a flowchart illustrating still another flow of error correction in the error detecting operation shown in FIG. 7.

Therefore, instead of the error correction shown in FIG. 8, a processing operation shown in FIG. 10 may be carried out, so as to transmit an abnormality report mail to the server 12, exclusively in the case where an error having occurred to the digital complex machine 30 continues for predetermined time.

More specifically, in the error correction shown in FIG. 10, the main CPU 401 displays contents of the error, then remains in a stand-by state (S31) until the error is corrected by the user, and after the correction of the error, resets the display of the LCD section 104 (S34, S35). Then, while being in the stand-by state, the main CPU 401 measures time having passed since the error occurrence, and transmits an abnormality report mail when it determines that predetermined time has just passed (S32, S33).

By so doing, it is possible to notify the server 12 of a significant error lasting for a long time by means of an abnormality report mail, and hence, it is possible to prevent transmission of many, unnecessary abnormality report mails to the server 12.

Furthermore, in this error correction, in the case where an extremely long-lasting, significant error occurs, or in the case where the user does not notice abnormality, an abnormality report mail is transmitted. Therefore, the manager can easily confirm that an extremely significant error has occurred, or that the user has not noticed an error.

Furthermore, in the error correction shown in FIG. 10, transmission of an abnormality report mail to the server 12 is preferably made as early as possible, in the case where an error is extremely significant. Therefore, the main CPU 401 is preferably arranged so as to adjust the length of the foregoing time (until transmission of an abnormality report mail), according to contents of the error determined. More specifically, in the case where an error is significant, the predetermined time is preferably set shorten so that transmission of an abnormality report mail should be made earlier.

This enables prompt transmission of an abnormality report mail when a significant error has occurred. Therefore, the manager is allowed to promptly confirm that a significant error has occurred to the digital complex machine 30.

Furthermore, an abnormal matter that occurs very often, irrespective of the magnitude thereof, is preferably notified to the manager. Therefore, instead of the error correction shown in FIG. 8, a processing operation shown in FIG. 11 may be carried out, to transmit an abnormality report mail to the server 12 only in the case where an error have occurred at a frequency exceeding a predetermined value.

Figure 11:
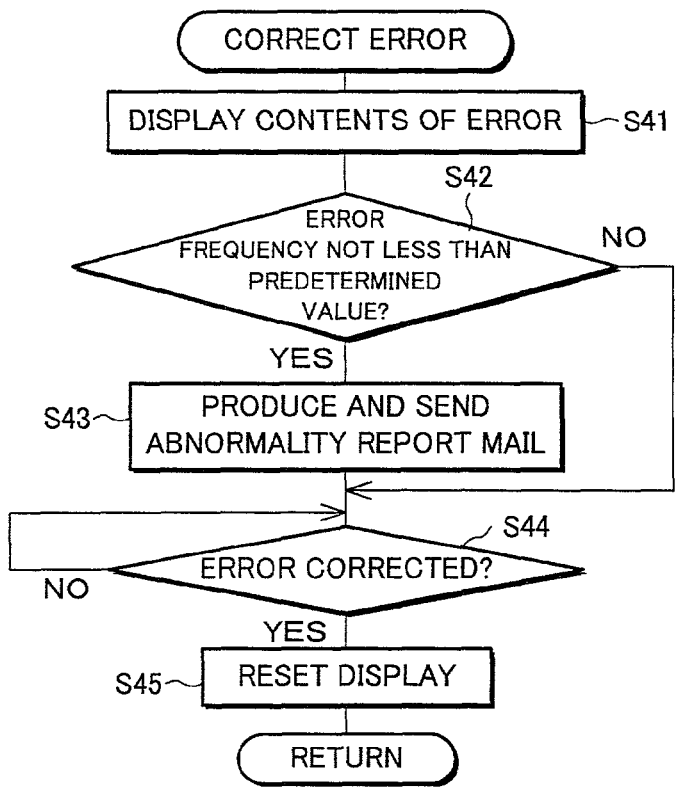
FIG. 11 is a flowchart illustrating still another flow of error correction in the error detecting operation shown in FIG. 7

More specifically, in the error correction shown in FIG. 11, the main CPU 401, after displaying contents of the error (S41), remains in a stand-by state until the error is corrected by the user, and resets display on the LCD section 104 after correction of the error (S44, S45). Then, while being in the stand-by state, the main CPU 401 measures the number of times of occurrence of errors within predetermined time, to determine the frequency of occurrence of errors (error frequency), and transmits an abnormality report mail when determining that the measured frequency exceeds a predetermined value (S42, S43).

Therefore, in this error correction, an error that occurs frequently, even though being a small error lasting a short time, is notified by an abnormality report mail to the server 12. Further, since this processing is set so that an abnormality report mail is transmitted exclusively in the case where an error has frequently occurred, it is possible to prevent transmission of many, unnecessary abnormality report mails.

Further, in the error correction shown in FIG. 11, an abnormality report mail is preferably transmitted in the case where the error is very significant, even though the frequency is low.

Therefore, the main CPU 401 is preferably arranged so as to adjust the foregoing predetermined value (a threshold value of a frequency of occurrence of errors for use in determining whether or not transmission of an abnormality report mail). In other words, in the case where the error is serious, the transmission processing section sets the foregoing predetermined value lower, so as to promote transmission of an abnormality report mail.

This ensures transmission of an abnormality report mail upon occurrence of a significant error. Therefore, the manager is allowed to surely confirm occurrence of a significant error.

Furthermore, in the error correction shown in FIGS. 9 through 11, the main CPU 401 preferably has an abnormality report mail to contain history information of an error that has occurred within predetermined time. Here, history information means contents of an error and times of occurrence of an error. This makes it possible to makes a detailed report to the manager.

Furthermore, in the processing operation shown in FIG. 7, the main CPU 401 is set so as to carry out an error detecting operation during an operation by the digital complex machine 30 or self-checking conducted by the main CPU 401. However, the main CPU 401 is not limited to this, and may be arranged so as to carry out error detection at a time of regular checking by the manager of the head office E.

Figure 12:
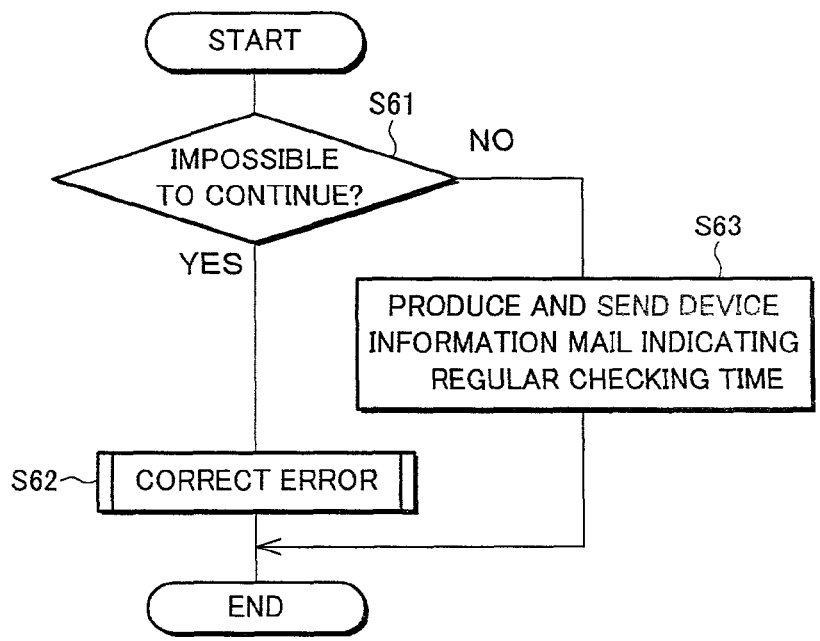
FIG. 12 is a flowchart illustrating flow of another error detecting operation in the aforementioned main CPU.

In this case, the main CPU 401 conducts error detection processing as shown in FIG. 12. In the processing shown in FIG. 12, the main CPU 401 is set so as to determine whether or not an operation of the digital complex machine 30 can be continued (whether or not an error that has occurred would hinder the operation), at the regular checking time of the digital complex machine 30 (S61).

When judging that continuation of the operation is impossible, the main CPU 401 conducts any one of the error correction shown in FIGS. 8 through 11 (S62). On the other hand, when judging that continuation of the operation is possible, the main CPU 401, along with the sub CPU 601*e*, produces a device information mail indicating that the regular checking time has come, and sends the same to the server 12 (S63), whereby the processing ends.

This processing is set so that, in the case where an error having occurred is an error at a level such that the digital complex machine 30 can continue an operation (for instance, regular replacement, adjustment, cleaning, etc. of component elements), a device information mail indicating that the regular checking time is coming is transmitted to the server 12. This allows the manager to surely know that the regular checking time is coming.

Furthermore, in the present embodiment, the main CPU 401 in the digital complex machine 30 detects abnormality, and the main CPU 401 and the sub CPU 601*e* produce an abnormality report mail and send the same.

However, the setting is not limited to the foregoing, and may be such that detection of abnormality, and the production and transmission of an abnormality report mail may be executed by another sub CPU inside the digital complex machine 30 or the PC 13 (or PCs 11*a* through 11*c*) connected with the digital complex machine 30.

Furthermore, in the first embodiment, the mail data M2 are data in the text format (document data) set according to the electronic mail system. The mail data M2, however, is not limited to data in the text format, and may be data in another standard format set according to the electronic mail system (for example, the HTML format).

Furthermore, in the first and second embodiments, the digital complex machine 30 is taken as an example of a management target device in accordance with the present invention. A management target device in accordance with the present invention, however, may be any type of device, not limited to the digital complex machine 30, provided that it is a device set so that repair, replenishment of expendable supplies, etc. can be conducted by not only the user of the management target machine but also a manager at a service company or a manufacturer.

Examples of a management device other than the digital complex machine 30 include a facsimile machine, a printer, a copying machine, a computer, an air cleaner, air conditioner, automatic vending machines for drinks and alcohols, a water cooler, a public telephone, a washing machine and a dryer provided at a coin laundry, a car washer at a self car wash, and various kinds of alarming machines.

Furthermore, the POS terminals 10, provided at the stores A through C in the first embodiment as terminal devices of the POS system, along with the server 12 at the head office E, may constitute a POS system via the network N.

Here, the POS system is a system composed of a host computer for managing the system and the POS terminals (registers) disposed at retail stores such as the stores A through C. This system is set so that sales records of commodities are transmitted to the host computer by having bar codes on the commodities read by a scanner of a register upon sale of the commodities.

Thus, the POS system is arranged so that the host computer can accurately grasp commodity information (sales, inventories, etc.) of each store at real time, and appropriately deals with distribution.

Here, the POS terminal 10 or the PC 13 may convert the sales records of commodities that are obtained at the POS terminal 10 into attached data M3, and transmit the same by having the same contained in an E-mail. This enables enhancement of confidentiality of sales records in the POS system.

Furthermore, in the first and second embodiments, production and transmission of E-mails (device information mails or abnormality report mails) by the digital complex machine 30 are carried out by the main CPU 401 and the sub CPU 601e. However, not limited to this, programs for production and transmission of E-mails may be recorded in a recording medium and an information processing device capable of reading out the program may be provided, in the place of the main CPU 401 and the sub CPU 601e.

In this arrangement, a computing unit (CPU or MPU) of an information processing device reads out programs recorded in a recording medium, and executes production and transmission of E-mails. Therefore, it can be regarded that the program itself should implement production and transmission of E-mails.

Here, as the foregoing information processing device, a function extension board, a function extension unit, or the like may be employed, apart from common computers (work stations, personal computers).

Furthermore, the foregoing program is a program code (execution-format program, intermediate code program, source program, etc.) of software that implements production and transmission of E-mails. This program may be a program that is solely used or a program that is used in combination with another program (OS, etc.) Moreover, this program may be a program that is read out of a recording medium, temporarily stored in a memory (RAM, etc.) in a device, and thereafter read out thereof so as to be implemented.

Furthermore, a recording medium for recording programs may be separable with ease from an information processing device, or may be fixed (mounted) to a device. Furthermore, it may be connected with a device, as an external memory device.

Examples of such a recording device include a magnetic tape such as a video tape or a cassette tape, a magnetic disk such as a floppy disk or a hard disk, an optical disk (magneto-optical disk) such as a CD-ROM, an MO, an MD, a DVD, or a CD-R, a memory card such as an IC card or an optical card, and a semiconductor memory such as mask ROM, an EPROM, an EEPROM, or a flash ROM.

Furthermore, a recording medium connected with an information processing device via a network (intranet, internet, etc.) may be used. In this case, the information processing device obtains programs by downloading the same via the network. In other words, the foregoing programs may be obtained via a transmission medium (medium for dynamically holding programs) such as a network (connected with a wired line or a wireless line). Incidentally, the program for downloading is preferably stored in the device.

Furthermore, the MC board 200 shown in FIG. 3 may be arranged so as to control the readout scanner section (scanner section 31) instead of the scanner unit 40. Furthermore, image reading may be carried out by the CCD board 300 and the SU 40.

Furthermore, the "state of trouble" shown in Table 1 may be described as "trouble report". Besides, device information may be set so as to be collected by the main CPU 401 of each digital complex machine 30 and edited into document data in the E-mail format on the printer board 601, and the device information of each digital complex machine 30 thus formed may be transmitted by E-mails with attached files through the network I/F.

Furthermore, while the sub CPU 601e shown in FIG. 3 may describe basic information by mail data M2, attached data may be produced from another information containing a state of use and attached to mail data M2.

Furthermore, upon production of attached data M3, a state of use and a state of trouble may be converted into attached data M3 by means of market-available common software that is installed in a personal computer in a local area network (LAN) environment along with the digital complex machine 30, which is available by loading a network interface card (NIC) in the network I/F601d of the printer board 601. Alternatively, transmission of the information of the digital complex machine 30 to the head office E may be completed by the main CPU 401 in the digital complex machine 30.

Furthermore, the prior art system for the remote management system of the present invention can be regarded as a device that grasps a state of a management target device at a remote place so as to take appropriate actions suitable for the state of the management target device. Further, by regularly managing (supervising) information of the management target device such as a state of use (counter information, etc.) of the device, a device state information (state of operation, trouble information, etc.), conditions allowing the device to operate in a stable state, such as regular checking, replacement of expendable elements, replenishment of expendable supplies, etc. are established.

Further, the system is arranged so that a system notifying the manager of various information regarding the management target device via communication lines such as networks and telephone lines. By using the foregoing system, a service system in which a state of a management target device is checked at real time and actions can be taken promptly (for instance, by notifying it by E-mail when the device becomes unable to continue a prescribed operation, by constantly notifying information concerning a state of the device by E-mail, or the like) can be provided.

However, in a system that reports a change to a state of a device (a change that makes continuation of a current operation impossible) whenever it occurs, the following problem possibly occurs: if the user, while recovering the device, causes the device to operate in a state not completely recovered, the device automatically detects a state of the device in which an operation cannot be continued, and immediately sends an E-mail for report of the state. In other words, since occurrence of such a state making continuation of an operation impossible until complete recover of the operation-performable state of the device, a plurality of E-mails could be transmitted to the manager. Therefore the present invention has an object to appropriately notifying the manager of information regarding a state of a device such as a state of being unable to continue an operation.

Furthermore, the arrangement of the second embodiment provides immediate report (notice) to a predetermined destination (service center), when one digital complex machine 30 falls in a state that requires prompt actions (serious trouble: a state from which it is difficult for the user at the location of the machine 30 to recover the machine into a normally operable state). Therefore, this enables the manager at the service center that has confirmed the report to take immediate actions (for recovering the machine from the serious trouble state).

On the other hand, it is also possible to stop notification by E-mail to the service center in the case where the digital complex machine 30 is in a state from which it is easy for the user to recover the machine 30 into a normally operable state (for instance, paper jam, no paper, no toner, etc.). Furthermore, in some cases such as regular replacement, adjustment, cleaning of elements, the digital complex machine 30 is not stopped but let to continue a recording operation though it is notified to the service center by E-mail that it is time to subject the digital complex machine 30 to maintenance.

Furthermore, since actions that can be taken vary according to skills of the users, individual states of the digital complex machine 30 that should be notified to the service center may be set according to the skills (levels of understanding) of the user.

Furthermore, FIG. 12 is a flowchart that illustrates a processing operation in which, when continuation of a recording operation by the digital complex machine 30 becomes impossible or when the digital complex machine 30 becomes in a predetermined state, whether or not notification to the service center by E-mail should be carried out should be checked according to the error management table T1 so that an operation suitable for the checked result should be carried out.

Furthermore, the arrangement of the second embodiment may be further arranged so that, even if the digital complex machine 30 becomes in a predetermined state, the notification by E-mail should be delayed by predetermined time. Besides, if the digital complex machine 30 repeatedly becomes in a certain prescribed state within predetermined time, it may be further arranged so that only one E-mail should be made to notify the repeated states.

Furthermore, in the case where the digital complex machine 30 becomes in a certain prescribed state again within predetermined time, the notification by E-mail to the service center may be stopped. Moreover, in the case where the digital complex machine 30 becomes in a certain prescribed state repeatedly in predetermined time, information regarding the digital complex machine 30 may be reported at once (including the number of times of occurrence).

This is advantageous, for the managing side (service center (head office E)) as well, since, even if actions taken for recovery of the digital complex machine 30 from the recording operation disability are inadequate, same information regarding the state of the digital complex machine 30 is prevented from being repeatedly transmitted by E-mail to the service center, and further, the transmission of the information is implemented by only one E-mail.

As described above, a first information communication device (first communication device) in accordance with the present invention is an information communication device notifying a managing device of device information about a management target device by electric mail, and is arranged by comprising a transmission processing section that converts the device information into attached data, and transmits an electric mail containing the attached data to the managing device.

The foregoing first communication device is arranged so that a transmission processing section transmits device information of the management target device to the managing device by electric mail. The transmission processing section particularly converts device information into attached data in an attached file format and has the same contained in an electric mail to be transmitted to the managing device.

This means that the first communication device is set so that device information is transmitted in the form of attached data that are less likely perceived by the third party. Therefore, it is possible to prevent leakage of device information.

Furthermore, said transmission processing section may be set so as to convert a part of the device information into mail data in an electric mail format, while to convert the other part of the device information into attached data, and to transmit an electric mail containing the attached data and the mail data to said managing device. Thus, by converting into attached data only confidential information that should be preferably not disclosed to the third party, leakage of confidential information can be suppressed, while burden on the process for producing attached data can be reduced.

Furthermore, the first communication device preferably further includes an information selecting section for selecting information that should be attached data out of the device information, in response to an instruction from the external, wherein said transmission processing section is set so as to convert the information selected by said information selecting section into attached data.

In the foregoing arrangement, the instruction from the external is an instruction from the manager or the user of the management target device. With this arrangement, device information can be converted into attached data as requested by a manager or a user, and hence, efficient production of E-mails can be realized.

Furthermore, the transmission processing section is preferably set so as to convert use information indicative of a state of use of the management target device into attached data. The use information is an image output state (copy volume, usage of toner), etc. if the management target device is a copying machine. Such use information is information according to a quantity of jobs of the user, which is confidential information that the user does not like to let the third party know. In the foregoing arrangement, use information can be appropriately protected by transmitting confidential information in the form of attached data.

Furthermore, the transmission processing section is preferably set so as to transmit device information about a plurality of management target devices located in a predetermined area by a same electric mail.

The management target devices located in a predetermined area are, like devices used in the same user (office), those which are desirably managed all together. This arrangement allows the manager to grasp information about a plurality of management target devices in the predetermined area at once, and hence, to efficiently issue relevant documents (bills, etc.), thereby resulting in improvement of services. Furthermore, it also allows the manager to judge necessity of regular checking or replenishment of expendable supplies in each area individually, thereby resulting in a decrease in the number of his/her visits to the area, and reduction of costs for maintenance.

Furthermore, the transmission processing section is preferably set so as to send the electric mail transmitted to the manager, also to another destination according to a request by a user.

The foregoing arrangement ensures transmission of device information to, not only the manager, but also a destination requested by the user. Therefore, by setting E-mail transmission, for instance, so that an E-mail should be transmitted to a responsible person on the user's side as well, the responsible person can grasp device information of management target devices used, in the same manner as the manager does. Furthermore, relevant documents issued by the manager can be easily checked on the user's side.

Furthermore, the transmission processing section preferably includes an encoding section for encoding attached data. Besides, it is preferably set so as to have the encoded attached data in an electric mail. This setting makes attached data be encoded and attached to an E-mail, thereby more firmly protecting device information.

Furthermore, a remote management system that is capable of suppressing leakage of device information can be constructed by connecting, via a network, (i) the first communication device, (ii) a management target device that causes said first communication device to transmit device information by an electric mail, and (iii) a managing device for remote management of said management target device, based on the device information contained in the electric mail transmitted from said first communication device.

Furthermore, a first information communication method (first communication method) in accordance with the present invention is an information communication method for notifying a managing device of device information about a management target device by electric mail, said method comprising the steps of (i) converting the device information into attached data, and (ii) transmitting an electric mail containing the attached data to said managing device. This first communication method is an information communication method adapted in the first communication device described above.

Specifically, the first communication method is set so that device information is converted into attached data that are hardly perceived by the third party, and an E-mail containing the attached data is transmitted to the managing device. By so doing, the first communication method is capable of suppressing leakage of device information.

Furthermore, a second information communication device (second communication device) in accordance with the present invention is an information communication device notifying a managing device of device information about a management target device by electric mail, and characterized by comprising (i) an abnormality detecting section for detecting an abnormal state of said management target device, (ii) an abnormality management table that lists abnormal states to be notified to said managing device, and (iii) a transmission processing section that, in the case where an abnormal state detected by said abnormality detecting section is indicated in said abnormality management table, produces an abnormality report mail containing contents of the abnormal state, and transmits the abnormality report mail to said managing device.

Furthermore, a third information communication device (third communication device) in accordance with the present invention is an information communication device notifying a managing device of device information about a management target device by electric mail, and is characterized by comprising (i) an abnormality detecting section for detecting an abnormal state of said management target device, and (ii) a transmission processing section that, in the case where an abnormal state of said management target device is detected by said abnormality detecting section, produces an abnormality report mail containing contents of the abnormal state, and transmits the abnormality report mail to said managing device, wherein said transmission processing section is set so as to, in the case where an abnormal state is again detected within predetermined time since latest transmission of an abnormality report mail, refrain from transmitting another abnormality report mail.

Furthermore, a fourth information communication device (fourth communication device) in accordance with the present invention is an information communication device notifying a managing device of device information about a management target device by electric mail, and is characterized by comprising (i) an abnormality detecting section for detecting an abnormal state of said management target device, and (ii) a transmission processing section that, in the case where said management target device continuously remains in an abnormal state for not less than predetermined time, produces an abnormality report mail containing contents of the abnormal state, and transmits the abnormality report mail to said managing device.

Furthermore, a fifth information communication device (fifth communication device) in accordance with the present invention is an information communication device notifying a managing device of device information about a management target device by electric mail, and is characterized by comprising (i) an abnormality detecting section for detecting an abnormal state of said management target device, and (ii) a transmission processing section that counts the number of times of occurrence of an abnormal state within predetermined time, and when judging that a frequency of occurrence of an abnormal state is not less than a predetermined value, produces an abnormality report mail containing contents of the abnormal state, and transmits the abnormality report mail to said managing device.

These second through fifth communication devices are arranged so as to transmit device information of management target devices to managing devices by E-mail.

Further, each of the second through fifth communication devices is equipped with an abnormality detecting section for detecting abnormality (error) of the management target device. The transmission processing section is set so as to produce an E-mail (abnormality report mail) containing contents of the abnormal state based on the result of detection by the abnormality detecting section, and to transmit the same to the managing device.

The second communication device, in particular, is provided with an abnormality management table that lists abnormal states to be notified to said managing device. The table can be set for each management target device individually, by the user of the management target device or the manager.

Besides, the second communication device is set so as to, exclusively in the case where an abnormal state detected by the abnormality detecting section is indicated in said abnormality management table, transmits an abnormality report mail containing contents of the abnormal state to the managing device. In other words, the second communication device is set so as to carry out notification of an abnormal state to the managing device selectively according to the contents of the abnormal state.

This enables decrease of the number of abnormality report mails transmitted to the managing device. Therefore, the manager is allowed to reduce costs for management and to take prompt actions (recovery of the management target device).

Incidentally, the contents of the aforementioned abnormality management table is preferably set by the user of the management target device. This makes it possible to set kinds of abnormal states to be notified to the manager, according to a level of each user's skill. This permits the manager to carry out maintenance services according to the level of each user's skill.

Furthermore, generally, in the case where an abnormal matter occurs during an operation of a management target device, it is, if small, easily corrected by the user, and therefore the abnormal state can be corrected within a short time. On the other hand, if the abnormal matter that has occurred is serious, it is difficult for the user to completely correct the same. Therefore, the abnormal state is left without being corrected for a long time, or even if corrected once, it occurs again soon.

Here, in an arrangement in which an abnormality report mail is transmitted each time abnormality is detected, an abnormality report mail having the same contents is possibly transmitted repeatedly during an operation of the management target device or during the user's recovering operation.

Therefore, in the third communication device, to avoid the foregoing problem, the transmission processing section is set so as to, in the case where an abnormal state is again detected within predetermined time since latest transmission of an abnormality report mail, refrain from another transmission of the abnormality report mail.

More specifically, the third communication device is arranged so that within predetermined time only one abnormality report mail should be transmitted in both the case where an abnormal state that has been produced is a slight one lasting short and the case where an abnormal state that has been produced is a serious one lasting long. Therefore, even if the user makes a mistake during a recovery operation, repeated transmission of an abnormality report mail stemming from a same error can be prevented. This makes it possible to avoid transmission of many, unnecessary abnormality report mails to the manager.

Furthermore, in the third communication device, in the case where a serious abnormal state that lasts long is produced or in the case where the user does not notice abnormality, an abnormality report mail is repeatedly transmitted. Therefore, the manager can confirm that a very serious abnormal matter has occurred or that the user has not noticed the abnormality.

Incidentally, even if an abnormal state is detected a plurality of times, in the case where the detections are within predetermined time, the third communication device is set so as to transmit an abnormality report mail only once. However, the transmission processing section may be set so that, in the case where the abnormal state is very serious, a plurality of abnormality report mails should be transmitted to the managing device, to attract the manager's attention.

Then, the third communication device is preferably arranged so that the transmission processing section should determine contents (kind) of an abnormal state, and adjust a length of the aforementioned predetermined time (a time for determining whether or not re-transmission of an abnormality report mail is appropriate) according to the content determined. In short, in the case where the abnormal state is serious, the transmission processing section preferably sets the predetermined time short, and promotes re-transmission of the abnormality report mail.

This ensures that an abnormality report mail can be transmitted a plurality of times at short intervals when a serious abnormal state is produced, thereby allowing the manager to easily confirm the occurrence of a serious abnormal matter.

Furthermore, as described above, in the case where an abnormal matter that has occurred to a management target device is small, it is easily corrected by the user, and therefore the abnormal state can be corrected within a short time. It is also considered that if the abnormal matter is to be corrected within a short time, there is no need to notify the managing device.

Then, the fourth communication device is arranged so that the transmission processing section should measure how long an abnormal state lasts in the management target device, and that, in the case where an abnormal state lasts for not less than predetermined time, an abnormality report mail is sent to the managing device. This enables setting such that only a long-lasting, serious abnormal matter is notified to the manager by an abnormality report mail, thereby making it possible to prevent transmission of many, unnecessary abnormality report mails to the managing device.

Furthermore, the fourth communication device is arranged so that, in the case where a long-lasting serious abnormal state is produced, or in the case where the user does not notice abnormality, an abnormality report mail is transmitted. This allows the manager to easily confirm that a serious abnormal matter has occurred or that the user has not yet notice the abnormality.

Incidentally, the fourth communication device is set so that, in the case where an abnormal state lasts for not less than predetermined time, an abnormality report mail should be sent. However, in the case where an abnormal state is very serious, it is preferable that an abnormality report mail should be transmitted to the managing device as early as possible.

Therefore, in the fourth communication device, the transmission processing section is preferably arranged so as to determine contents of an abnormal state and to adjust a length of the foregoing predetermined time (time until transmission of an abnormality report mail) according to the contents determined. More specifically, in the case where the abnormal state is serious, the transmission processing section is preferably arranged so as to set the predetermined time short and to set the transmission of an abnormality report mail earlier.

This makes it possible to transmit an abnormality report immediately upon occurrence of a serious abnormal state, thereby allowing the manager to promptly confirm occurrence of serious abnormality.

Furthermore, an abnormal matter that occurs very often, irrespective of the magnitude thereof, is preferably notified to the manager. Therefore, the fifth communication device is arranged so as that the transmission processing section should determine a frequency of occurrence of an abnormal state by counting the number of time of occurrence of the abnormal state within predetermined time. In the case where the frequency is not less than a predetermined value, an abnormal report mail is transmitted to the managing device.

Therefore, the fifth communication device is arranged so that even a slight abnormal matter that lasts short, if frequently occurring, should be notified to the manager by an abnormality report mail. Further, the fifth communication device is set so that an abnormality report mail is transmitted exclusively in the case where an abnormal matter occurs frequently, transmission of many unnecessary abnormality report mails is prevented.

Incidentally, the fifth communication device is arranged so that only an abnormal matter that occurs frequently should be notified to the managing device. However, in the case where the abnormal state is very serious, an abnormal report mail is preferably transmitted even if the frequency of occurrence of the abnormal state is small.

Then, in the fifth communication device, the transmission processing section is preferably arranged so as to determine contents of the abnormal state and to adjust the aforementioned predetermined value (threshold value as to a frequency of occurrence of an abnormal state, used in determining whether or not an abnormality report mail should be transmitted). More specifically, the transmission processing section preferably sets a predetermined value small in the case where an abnormal state is serious, to promote transmission of an abnormality report mail.

This ensures that an abnormality report mail should be transmitted whenever a serious abnormal state is produced, whereby the manager can surely confirm occurrence of a serious abnormal matter.

Furthermore, in the fourth and fifth communication devices, the transmission processing section preferably causes the abnormality report mail to contain history information of abnormal states that has been produced in the management target device within predetermined time. Here, the history information has contents of an abnormal state and the number of times of occurrence thereof. This arrangement makes it possible to make a detailed report about occurrence of the abnormal state.

Furthermore, a remote management system that is capable of appropriately notifying a managing device of occurrence of an abnormal matter can be constructed by connecting, via a network, (i) any one of the second through fifth communication devices, (ii) a management target device that causes the one of the second through fifth communication devices to transmit device information by an electric mail, and (iii) a managing device for remote management of said management target device, based on the device information contained in the electric mail transmitted from the one of the second through fifth communication devices.

Furthermore, it is possible to express that a remote management system in accordance with the present invention is a remote management system for grasping a state of a device at a remote place by means of a communication device, which system notifies a managing device of a state of the device at a remote place at predetermined timings according to the state of the device.

Furthermore, it is possible to embody an information communication method in accordance with the present invention as an information communication method for notifying a managing device of device information about a management target device by electric mail, which method includes (i) an abnormality detecting step of detecting an abnormal state of said management target device, and (ii) a transmitting step of, in the case where an abnormal state detected in said abnormality detecting step is indicated in an abnormality management table that lists abnormal states to be notified to said managing device, producing an abnormality report mail containing contents of the abnormal state and transmitting the abnormality report mail to said managing device.

Furthermore, it is possible to embody an information communication method in accordance with the present invention as an information communication method for notifying a managing device of device information about a management target device by electric mail, which method includes (i) an abnormality detecting step of detecting an abnormal state of said management target device, and (ii) a transmitting step of, in the case where an abnormal state of said management target device is detected in said abnormality detecting step, producing an abnormality report mail containing contents of the abnormal state, and transmitting the abnormality report mail to said managing device, wherein said transmitting step is set so that, in the case where an abnormal state is again detected within predetermined time since latest transmission of an abnormality report mail, another transmission of the abnormality report mail should be refrained.

Furthermore, it is possible to embody an information communication method in accordance with the present invention as an information communication method for notifying a managing device of device information about a management target device by electric mail, which method includes (i) an abnormality detecting step of detecting an abnormal state of said management target device, and (ii) a transmitting step of, in the case where said management target device continuously remains in an abnormal state for not less than predetermined time, producing an abnormality report mail containing contents of the abnormal state, and transmitting the abnormality report mail to said managing device.

Furthermore, an information communication method in accordance with the present invention is an information communication method for notifying a managing device of device information about a management target device by electric mail, which method includes (i) an abnormality detecting step of detecting an abnormal state of said management target device, and (ii) a transmitting step of counting the number of times of occurrence of an abnormal state within predetermined time, and in the case where a frequency of occurrence of an abnormal state is not less than a predetermined value, producing an abnormality report mail containing contents of the abnormal state, and transmitting the abnormality report mail to said managing device.

Furthermore, a remote management system that is capable of suppressing leakage of device information can be constructed by connecting, via a network, (i) any one of the second through fifth communication devices, (ii) a management target device that causes the one of the second through fifth communication devices to transmit device information by an electric mail, and (iii) a managing device for remote management of said management target device, based on the device information contained in the electric mail transmitted from the one of the second through fifth communication devices.

The present invention can be embodied in any one of sixth through eleventh information communication devices, a first remote management system, and a second information communication method. More specifically, the sixth information communication device is an information communication device notifying a managing device of information (device information) about a management target device by electric mail, and is arranged so as to include a transmission processing section that transmits a part of the device information as data in an electric mail format (mail data), while converts the other part of the device information as data into an attached file format (attached data) and attaches the same to mail data to transmit the same.

In the foregoing arrangement, the management target device is a device that is set so that repair, replenishment of expendable supplies, etc. are carried out by a manager (service company, manufacturer) other than a user. Further, the managing device is a device placed at the manager, for collecting information of the management target device (device information). The foregoing communication device is arranged so that the transmission processing section transmits the device information of the management target device to the managing device by E-mail. Besides, particularly, the transmission processing section is set so that a part of device information should be transmitted in the form of attached data that are less likely perceived by the third party. Therefore, by transmitting information confidential to the third party (confidential information) in the form of attached data, leakage of confidential information can be avoided.

Furthermore, the seventh information communication device is the sixth information communication device further arranged so that the transmission processing section is set so as to convert information (use information) indicative of a state of use of a device into attached data, and to attach the same to the mail data.

The use information is, for instance in the case of a copying machine, an image output situation (copy volume), etc. Such use information is information according to a quantity of jobs the user has done, and it is information that the user does not wish to let the third party know. In the foregoing arrangement, the use information is transmitted in the form of attached data thereby being appropriately protected.

Furthermore, the eighth information communication device is the sixth information communication device further arranged so that said transmission processing section includes an encoding section for encoding attached data and attaching the same to the mail data. Since the attached data is encoded before transmission, the attached data can be firmly protected.

Furthermore, the ninth information communication device is the sixth information communication device further arranged so that the foregoing transmission processing section includes an information selecting section that selects information to be converted into attached data form, according to an instruction of the managing device (or the manager). This allows information requested by the manager to be transmitted in the attached data form.

Furthermore, the tenth information communication device is the sixth information communication device further arranged so that the foregoing transmission processing section is set so as to transmit device information of a plurality of management target devices located in a predetermined area at once.

The management target devices in a predetermined area are a group of devices that are preferably managed all together, such as devices used in the same user (company, etc.). The foregoing arrangement allows the manager to grasp information of all devices in the area, and hence, to efficiently issue relevant documents (bills, etc.), thereby resulting in improvement of services. Furthermore, it also allows the manager to judge necessity of regular checking or replenishment of expendable supplies in each area individually, thereby resulting in an increase in the number of his/her visits to the area.

Furthermore, the eleventh information communication device is the sixth information communication device that is further arranged so that the transmission processing section is set so as to send the electric mail also to another destination according to a request by a user. The foregoing arrangement enables notification of device information to not only the manager but also the destination requested by the user (for instance, a responsible person on the user's side).

Therefore, the user is allowed to grasp the information of the management target device that the user is using, in the same manner as the manager does. Furthermore, the relevant document issued by the manager can be checked by the user.

Furthermore, the first remote management system includes any one of the sixth through eleventh information communication devices, a management target device that causes said information communication device to transmit device information, and a managing device for managing said management target device, based on device information transmitted from said information communication device.

Furthermore, the second information communication method is an information communication method for notifying a managing device of device information about a management target device by electric mail, said method comprising the steps of transmitting a part of device information in the form of data in an electric mail format (mail data), and converting the other part of the device information into data in an attached file format (attached data) and attaching the same to the mail data for transmission.

Furthermore, the present invention may be embodied in any one of second through fourteenth remote management systems. More specifically, the second remote management system is a remote management system that notifies a manager of information about a device by electric mail, and is arranged so as to, when information about a device becomes in a predetermined state, notifies the manager side of the information about the state by E-mail. This arrangement ensures that it is immediately reported (notified) to the predetermined destination when a device becomes in a state requiring immediate response, thereby allowing the manager that confirms the report to take a prompt action in response.

Furthermore, the third remote management system is a remote management system that notifies a manager of information about a device by electric mail, that is arranged so as to have a first notifying mode for notification of information about a device within predetermined time, and a second notifying mode for notification of information about a device when the device becomes in a predetermined state. The foregoing arrangement enables regular supervision of a state of a device, as well as ensures that it is immediately reported to a predetermined destination when the device shifts in a state that requires immediate response, thereby allowing the manager that confirms the report to take a prompt action in response.

Furthermore, the fourth remote management system is either the first or second remote management system that is further arranged so that the predetermined state of the device is an inoperable state of the device. This ensures that, even if the device shifts in a state such that an operation thereof stops, it is reported (notified) immediately to the predetermined destination, thereby allowing the manager who confirms the notification to take a prompt action to recover the device into an operable state.

Furthermore, the fifth remote management system is either the first or second remote management system further arranged so that, even if the device becomes in a predetermined state, the notification by E-mail should be delayed by predetermined time. With this, information about the same state of the device is prevented from being repeatedly notified, even if a mistake is made in recovering an operation of the device.

Furthermore, the sixth remote management system is the fifth remote management system further arranged so that, in the case where the device repeatedly becomes in a predetermined state within predetermined time, notification by E-mail is carried out at once (by one E-mail). With this, information about the same state of the device is prevented from being repeatedly notified, even if a mistake is made in recovering an operation of the device, but it is notified all together. Therefore, it is advantageous for the managing side as well.

Furthermore, the seventh remote management system is either the first or second remote management system further arranged so that, in the case where the device becomes in a predetermined state again in the predetermined time, notification by E-mail is refrained. With this, information about the same state of the device is prevented from being repeatedly notified, even if a mistake is made in recovering an operation of the device.

Furthermore, the eighth remote management system is either the first or second remote management system further arranged so that, in the case where a predetermined state of the device is continually produced in predetermined time, information about the device (including the number of times) should be notified at once. With this, information about the same state of the device is prevented from being repeatedly notified, even if a mistake is made in recovering an operation of the device, and it can be confirmed that the device continually falls in the same state. Therefore, it is advantageous for the managing side as well.

The ninth remote management system is a remote management system that notifies the manager of information about a device, that is arranged so that first information about a device to be notified to the manager should be notified in an E-mail format, while second information about a device to be notified to the manager should be notified in an attached file format of E-mail. This results in that various information about the device is divided into first information and second information while being notified to the device manager side, whereby information can be separated according to kinds of information.

Furthermore, the tenth remote management system is the ninth remote management system further arranged so that the first information about the device is information about a state (situation) of the device, and that the second information about the device is information about a state of use (counter information, etc.) of the device. This provides protection of information that should not be disclosed, such as a monthly image output situation (copy volume) of the location where the device is placed.

Furthermore, the eleventh remote management system is the ninth remote management system further arranged so that the second information (counter information, etc.) about a device to be notified in the E-mail attached file format should be subjected to predetermined processing (encoding). This causes specific information to be first encoded, then processed, thereby providing protection of information that should not be disclosed, such as a monthly image output situation (copy volume) of the location where the device is placed.

Furthermore, the twelfth remote management system is the ninth remote management system arranged so as to further include information classifying means for classifying the information about the device into the first information and the second information. This makes it possible to provide security for certain information.

Furthermore, the thirteenth remote management system is the ninth remote management system further arranged so that information about a plurality of management target devices should be notified by E-mail at once. This allows information to be managed for each location (contractor) of the device, and hence, situations of the plurality of devices to be confirmed (grasped) at once in, for instance, regular checking. Consequently, only one visit suffices for dealing with the plurality of devices, thereby leading to enhancement of services.

Furthermore, the fourteenth remote management system is the ninth remote management system further arranged so that information about a device is transmitted to a plurality of specific destinations by E-mail. By thus giving a notice to not only a service company in charge of maintenance but also a manager on the user side (location where the device is placed), both the parties are allowed to grasp the situation of the device. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information communication device notifying a managing device of device information collected regarding a management target device by electric mail, said information communication device comprising:
   an information selecting section for selecting local to the target device which of the collected device information is to be converted into mail data and which of the collected device information is to be converted into attached data; and
   a transmission processing section that converts the collected device information into all of (i) a header indicative of a destination and a title, (ii) attached data that is confidential information indicative of a state of the target device and (iii) mail data that is non-confidential information indicative of a state of the target device in an electric mail format, in accordance with the selection performed by the information selecting section, and, upon arrangement of the device information into the header, attached data and mail data, transmits a single electric mail containing all of the header, the attached data and the mail data to said managing device in a state in which attached confidential information cannot be accessed without a dedicated program used by said managing device easily;
   on-going selection of information being performed by the information selecting portion provided in the device and the selected information being sent.

2. The information communication device as set forth in claim 1, wherein said transmission processing section is set so as to convert use information indicating the state of use of said management target device into attached data.

3. The information communication device as set forth in claim 1, wherein said transmission processing section is set so as to transmit device information regarding a plurality of management target devices located in a predetermined area by a same electric mail.

4. The information communication device as set forth in claim 1, wherein said transmission processing section is set so as to send the electric mail transmitted to the manager, also to another destination according to a request by a user.

5. The information communication device as set forth in claim 1, wherein said transmission processing section includes an encoding section for encoding attached data, and is set so as to have the encoded attached data in an electric mail.

6. The information communication device as set forth in claim 1, wherein said attached data is produced by a dedicated program, whereby said attached data is readable only by said dedicated program.

7. The information communication device as set forth in claim 1, wherein said mail data being compressed at a first rate, and attached data is compressed at a second compression rate greater than said first compression rate.

8. The information communication device as set forth in claim 1, wherein the information selecting section selects, from out of the collected device information, device information that is of a confidential nature to be converted into attached data.

9. The information communicating device as set forth in claim 1, wherein said information election section selecting is at the target device.

10. A remote management system comprising:
    an information communication device notifying a managing device of device information collected regarding a management target device by electric mail, said information communication device including an information selecting section for selecting local to the target device which of the collected device information is to be converted into mail data and which of the collected device information is to be converted into attached data; and a transmission processing section that converts the device information into all of (i) a header indicative of a destination and a title, (ii) attached data that is confidential information indicative of a state of the target device and (iii) mail data that is non-confidential information indicative of a state of the target device in an electric mail format, in accordance with the selection performed by the information selecting section, and, upon arrangement of the device information into the header, attached data and man data, transmits a single electric mail containing hall of the header, the attached data and the mail data to said managing device in a state in which attached confidential information cannot be accessed without a dedicated program used by said managing device;
    on-going selection of information being performed by the information selecting portion provided in the device and the selected information being sent;

a management target device that causes said information communication device to transmit an electric mail containing device information; and a managing device that performs remote management of said management target device, based on the device information contained in the electric mail transmitted from said information communication device.

11. The remote management system as set forth in claim 10, wherein said information selection section selecting is at the target device.

12. An information communication method for notifying a managing device of device information collected regarding a management target device by electric mail, said method comprising the steps of:

selecting local to the target device which of the collected device information is to be converted into mail data and which of the collected data is to be converted into attached data;

converting the collected device information into all of (i) a header indicative of a destination and a title, (ii) attached data that is confidential information indicative of a state of the tarqet device and (iii) mail data that is non-confidential information indicative of a state of the target device in an electric mail format, in accordance with said selecting; and upon arrangement of the device information into the header, attached data and mail data, transmitting a single electric mail containing all of the header, the attached data and the mail data to said managing device in a state in which attached confidential information cannot be accessed without a dedicated program used by said managing device;

on-going selection of information being performed by the information selecting portion provided in the device and the selected information being sent.

13. The information communication method as set forth in claim 12, wherein said selecting is at the target device.

14. A non-transitory recording medium storing a computer program for information communication for notifying a managing device of device information collected regarding a management target device by electric mail, wherein:

said information communication includes the steps of selecting local to the target device which of the collected device information is to be converted into mail data and which of the collected information is to be converted into attached data, and converting the collected device information into all of (i) a header indicative of a destination and a title, (ii) attached data that is confidential information indicative of a state of the target device and (iii) mail data that is non-confidential information indicative of a state of the target device in an electric mail format, in accordance with said selecting and, upon arrangement of the device information into the header, attached data and mail data, transmitting a single electric mail containing all of the header, the attached data and the mail data to the managing device in a state in which attached confidential information cannot be accessed without a dedicated program used by said managing device;

on-going selection of information being performed by the information selecting portion provided in the device and the selected information being sent.

15. The recording medium storing a computer program as set forth in claim 14, wherein said selecting step is at the target device.

* * * * *